US008679630B2

(12) United States Patent
Maschmann et al.

(10) Patent No.: US 8,679,630 B2
(45) Date of Patent: Mar. 25, 2014

(54) VERTICAL CARBON NANOTUBE DEVICE IN NANOPOROUS TEMPLATES

(75) Inventors: Matthew Ralph Maschmann, Chandler, AZ (US); Timothy Scott Fisher, West Lafayette, IN (US); Timothy Sands, West Lafayette, IN (US); Rashid Bashir, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 1489 days.

(21) Appl. No.: 11/747,680

(22) Filed: May 11, 2007

(65) Prior Publication Data

US 2008/0176058 A1     Jul. 24, 2008

Related U.S. Application Data

(60) Provisional application No. 60/747,422, filed on May 17, 2006, provisional application No. 60/887,695, filed on Feb. 1, 2007.

(51) Int. Cl.
*B23B 9/00* (2006.01)

(52) U.S. Cl.
USPC .......................................... 428/408; 423/448

(58) Field of Classification Search
USPC .............. 428/408; 423/447.1, 447.2; 977/742
See application file for complete search history.

(56) References Cited

U.S. PATENT DOCUMENTS

| | | | |
|---|---|---|---|
| 4,851,195 A | 7/1989 | Matthews et al. | |
| 4,935,345 A | 6/1990 | Guilbeau et al. | |
| 5,246,859 A | 9/1993 | Nelson et al. | |
| 5,382,417 A | 1/1995 | Haase | |
| 5,993,694 A | 11/1999 | Ito et al. | |
| 6,129,901 A * | 10/2000 | Moskovits et al. | 423/447.3 |
| 6,139,713 A | 10/2000 | Masuda et al. | |
| 6,217,828 B1 | 4/2001 | Bretscher et al. | |
| 6,232,706 B1 | 5/2001 | Dai et al. | |
| 6,297,592 B1 * | 10/2001 | Goren et al. | 315/3.5 |
| 6,359,288 B1 | 3/2002 | Ying et al. | |
| 6,465,132 B1 | 10/2002 | Jin | |

(Continued)

FOREIGN PATENT DOCUMENTS

WO          03052181 A1    6/2003
WO          03091486       11/2003

(Continued)

OTHER PUBLICATIONS

Che et al., "Chemical Vapor Deposition Based Synthesis of Carbon Nanotubes and Nanofibers Using a Template Method," Chem. Mater., vol. 10, No. 1 (1998), pp. 260-267.

(Continued)

*Primary Examiner* — Maria Veronica Ewald
*Assistant Examiner* — Daniel H Miller
(74) *Attorney, Agent, or Firm* — John V. Daniluck; Brian W. Chellgren; Bingham Greenebaum Doll LLP

(57) ABSTRACT

A modified porous anodic alumina template (PAA) containing a thin CNT catalyst layer directly embedded into the pore walls. CNT synthesis using the template selectively catalyzes SWNTs and DWNTs from the embedded catalyst layer to the top PAA surface, creating a vertical CNT channel within the pores. Subsequent processing allows for easy contact metallization and adaptable functionalization of the CNTs and template for a myriad of applications.

42 Claims, 27 Drawing Sheets

(56) References Cited

U.S. PATENT DOCUMENTS

| | | |
|---|---|---|
| 6,489,394 B1 | 12/2002 | Andros |
| 6,566,704 B2 | 5/2003 | Choi et al. |
| 6,705,152 B2 | 3/2004 | Routkevitch et al. |
| 6,797,325 B2 | 9/2004 | Wang et al. |
| 6,855,603 B2 | 2/2005 | Choi et al. |
| 6,903,365 B1 | 6/2005 | Nihei |
| 6,998,634 B2 | 2/2006 | Cheong et al. |
| 7,037,767 B2 | 5/2006 | Hirai |
| 7,038,299 B2 | 5/2006 | Furukawa et al. |
| 7,084,002 B2 | 8/2006 | Kim et al. |
| 7,129,554 B2 | 10/2006 | Lieber et al. |
| 7,235,159 B2 | 6/2007 | Gu et al. |
| 7,317,047 B2 | 1/2008 | Hsu |
| 7,345,296 B2 | 3/2008 | Tombler, Jr. et al. |
| 7,371,674 B2 | 5/2008 | Suh et al. |
| 7,425,487 B2 | 9/2008 | Kreupl et al. |
| 7,449,757 B2 | 11/2008 | Bradley et al. |
| 7,452,452 B2 | 11/2008 | Ren et al. |
| 7,456,564 B2 | 11/2008 | Song et al. |
| 7,538,062 B1 | 5/2009 | Dai et al. |
| 7,576,410 B2 | 8/2009 | Rueb et al. |
| 7,608,905 B2 | 10/2009 | Bratkovski et al. |
| 7,615,492 B2 | 11/2009 | Yang et al. |
| 7,646,045 B2 | 1/2010 | Kreupl et al. |
| 2002/0117659 A1 | 8/2002 | Lieber et al. |
| 2003/0041438 A1 | 3/2003 | Wei et al. |
| 2003/0113713 A1 | 6/2003 | Glezer et al. |
| 2003/0134433 A1 | 7/2003 | Gabriel et al. |
| 2003/0143398 A1* | 7/2003 | Ohki et al. ............... 423/447.3 |
| 2003/0218224 A1 | 11/2003 | Schlaf et al. |
| 2004/0018587 A1 | 1/2004 | Makowski et al. |
| 2004/0023428 A1 | 2/2004 | Gole et al. |
| 2004/0065970 A1 | 4/2004 | Blanchet-Fincher |
| 2004/0091285 A1 | 5/2004 | Lewis |
| 2004/0120183 A1 | 6/2004 | Appenzeller et al. |
| 2004/0124504 A1 | 7/2004 | Hsu |
| 2004/0149979 A1 | 8/2004 | Cheong et al. |
| 2004/0158410 A1 | 8/2004 | Ono et al. |
| 2004/0200734 A1 | 10/2004 | Co et al. |
| 2004/0245209 A1 | 12/2004 | Jung et al. |
| 2004/0253805 A1 | 12/2004 | Dubin et al. |
| 2005/0048414 A1 | 3/2005 | Harnack et al. |
| 2005/0081625 A1 | 4/2005 | Chen et al. |
| 2005/0112049 A1 | 5/2005 | Hofmeister |
| 2005/0167655 A1 | 8/2005 | Furukawa et al. |
| 2005/0184641 A1 | 8/2005 | Armitage et al. |
| 2005/0188444 A1 | 8/2005 | Jeong et al. |
| 2005/0224779 A1 | 10/2005 | Wang et al. |
| 2005/0224888 A1 | 10/2005 | Graham et al. |
| 2005/0248256 A1 | 11/2005 | Song et al. |
| 2005/0249980 A1 | 11/2005 | Itoh et al. |
| 2005/0255313 A1 | 11/2005 | Kyotani et al. |
| 2005/0255581 A1 | 11/2005 | Kim et al. |
| 2006/0004271 A1 | 1/2006 | Peyser et al. |
| 2006/0128088 A1 | 6/2006 | Graham et al. |
| 2006/0177952 A1 | 8/2006 | Lambertini et al. |
| 2006/0208362 A1 | 9/2006 | Dubin |
| 2006/0231946 A1 | 10/2006 | Pan et al. |
| 2006/0240238 A1 | 10/2006 | Boussaad et al. |
| 2006/0244361 A1 | 11/2006 | Kim et al. |
| 2006/0270229 A1 | 11/2006 | Corderman et al. |
| 2006/0281306 A1 | 12/2006 | Gstrein et al. |
| 2007/0042377 A1 | 2/2007 | Gao et al. |
| 2007/0108482 A1 | 5/2007 | Bertin et al. |
| 2007/0114657 A1 | 5/2007 | Dangelo et al. |
| 2007/0208243 A1 | 9/2007 | Gabriel et al. |
| 2007/0275499 A1 | 11/2007 | Corderman et al. |
| 2008/0017845 A1 | 1/2008 | Drndic et al. |
| 2008/0020477 A1 | 1/2008 | Pronovost |
| 2008/0102213 A1 | 5/2008 | Afzali-Ardakani et al. |
| 2008/0296562 A1 | 12/2008 | Murduck et al. |
| 2008/0296563 A1 | 12/2008 | Bourgoin et al. |
| 2009/0017284 A1 | 1/2009 | Dionigi et al. |
| 2009/0061451 A1 | 3/2009 | Achim et al. |
| 2009/0084678 A1 | 4/2009 | Joshi et al. |
| 2009/0183816 A1 | 7/2009 | Min et al. |
| 2009/0297913 A1 | 12/2009 | Zhang et al. |
| 2010/0009134 A1 | 1/2010 | Drndic et al. |

FOREIGN PATENT DOCUMENTS

| | | |
|---|---|---|
| WO | 2004029176 A1 | 4/2004 |
| WO | 2004035462 | 4/2004 |
| WO | 2004087564 | 10/2004 |
| WO | 2005093872 A1 | 10/2005 |
| WO | 2006031981 | 3/2006 |
| WO | 2006060054 A1 | 6/2006 |
| WO | 2006135253 | 12/2006 |
| WO | 2007089550 A2 | 8/2007 |
| WO | 2008024674 A1 | 2/2008 |
| WO | 2008127293 A2 | 10/2008 |
| WO | 2008129524 A1 | 10/2008 |
| WO | 2009036071 A2 | 3/2009 |
| WO | 2009073927 A1 | 6/2009 |
| WO | 2009097357 A1 | 8/2009 |

OTHER PUBLICATIONS

Kamins et al., "Growth and Structure of Chemically Vapor Deposited Ge Nanowires on Si Substrates," Nano Lett., vol. 4, No. 3 (2004), pp. 503-506.

Kikkawa et al., "Growth rate of silicon nanowires," Appl. Phys. Lett. 86, 123109, (2005), pp. 1-3.

Li et al., "Highly-ordered carbon nanotube arrays for electronics applications," Appl. Phys. Lett., vol. 75, No. 3, (1999), pp. 367-369.

Maschmann et al., "Parametric study of synthesis conditions in plasma-enhanced CVD of high-quality single-walled carbon nanotubes," Carbon, vol. 44 (2006) pp. 10-18.

Masuda et al., Fabrication of Gold Nanodot Array Using Anodic Porous Alumina as an Evaporation Mask, Jpn. J. Appl. Phys., vol. 35 (1996), pp. L126-L129.

Persson et al., "Solid-phase diffusion mechanism for GaAs nanowire growth," Nature Materials, vol. 3, (2004), pp. 677-681.

Maschmann et al., "Vertical single- and double-walled carbon nanotubes grown from modified porous anodic alumina templates," Nanotechnology 17 (2006), pp. 3925-3929.

Franklin et al., "In-place fabrication of nanowire electrode arrays for vertical nanoelectronics on Si substrates," J. Vac. Sci. Technol. 825(2), Mar./Apr. 2007, pp. 343-347.

Maschmann et al., "Lithography-Free in Situ Pd Contacts to Templated Single-Walled Carbon Nanotubes," Nano Letters (2006), vol. 6, No. 12, pp. 2712-2717.

Ou et al., "Multisegmented on-dimensional hybrid structures of carbon nanotubes and metal nanowires," Applied Physics Letters 89, 243122 (2006), 4 pages.

Mclamore, E.S. et al. "A Self-Referencing Glutamate Biosensor for Measuring Real Time Neuronal Glutamate Flux" Journal of Neuroscience Methods, 2010, 189, pp. 14-22.

Dale, N; Hatz, S; Tian, F; and Llaudet, E "Listening to the Brain: Microelectrode Biosensors for Neurochemicals" Trends in Biotechnology, Aug. 2005, 23(8), pp. 420-428.

Bharathi, S and Nogami, M "A glucose biosensor based on electrodeposited biocomposites of gold nanoparticles and glucose oxidase enzyme" Analyst, 2001, 126(11), pp. 1919-1922.

U.S. Appl. No. 12/024,635, NF OA mailed Aug. 17, 2012, 10 pages.
U.S. Appl. No. 12/025,453, NF OA mailed Oct. 4, 2011, 10 pages.
Applicant Response, U.S. Appl. No. 12/025,453, filed Mar. 5, 2012, 15 pages.
U.S. Appl. No. 12/025,453, FR OA mailed Mar. 16, 2012, 10 pages.
U.S. Appl. No. 12/694,876, NF OA mailed Dec. 20, 2012, 13 pages.
U.S. Appl. No. 12/755,188, NF OA mailed Feb. 15, 2013, 10 pages.

\* cited by examiner

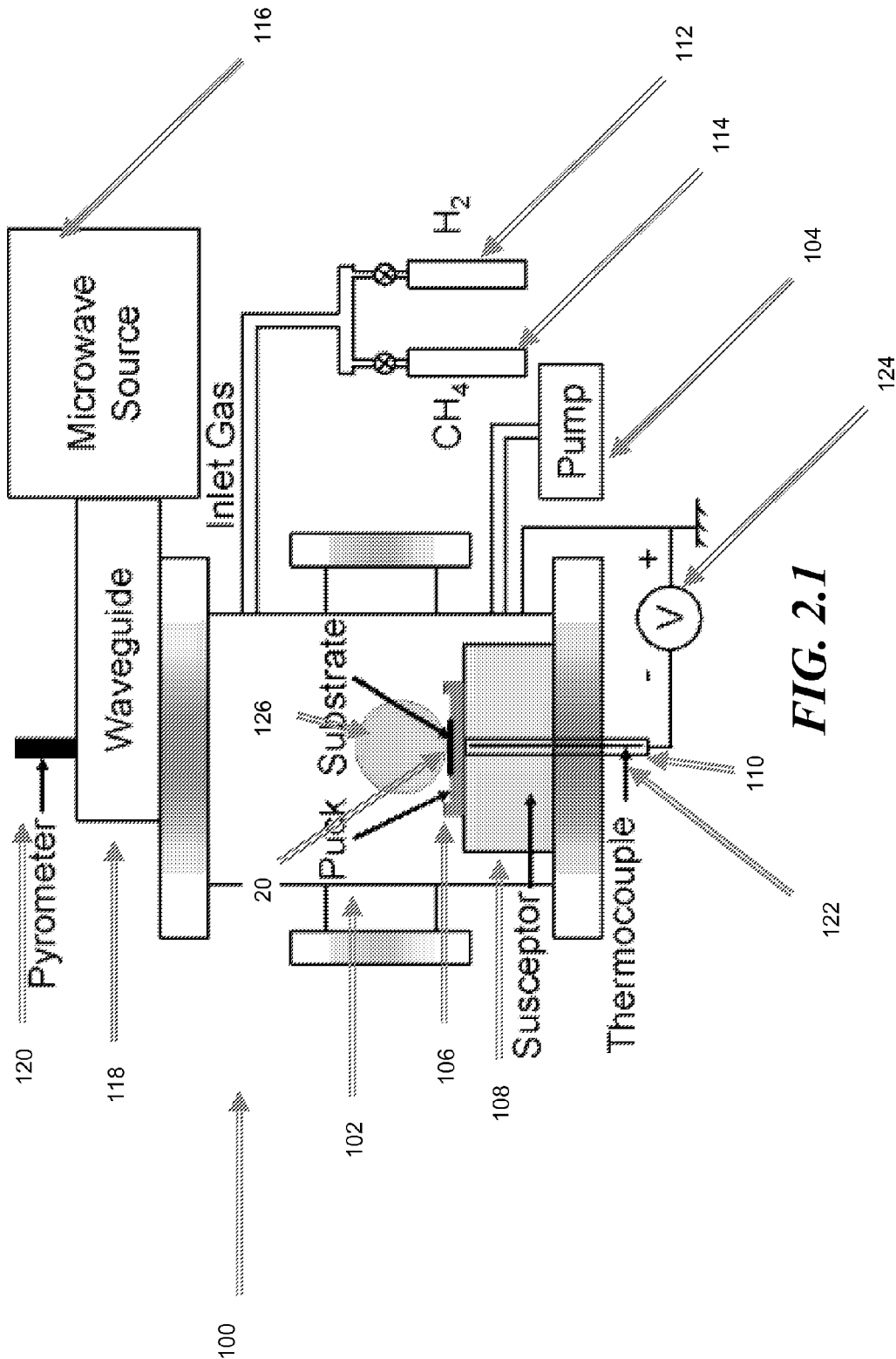
FIG. 2.1

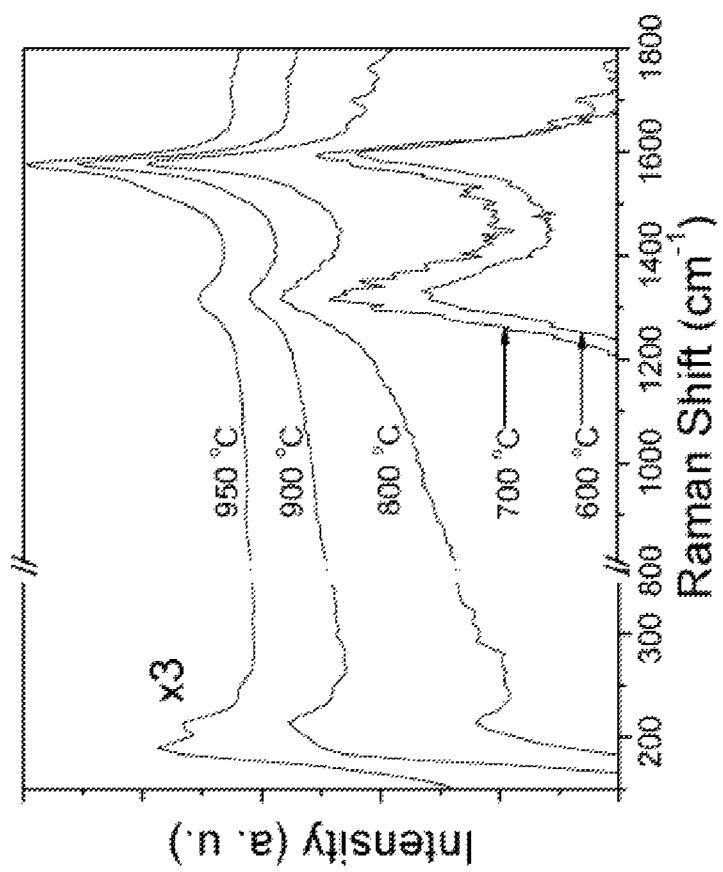
FIG. 2.2

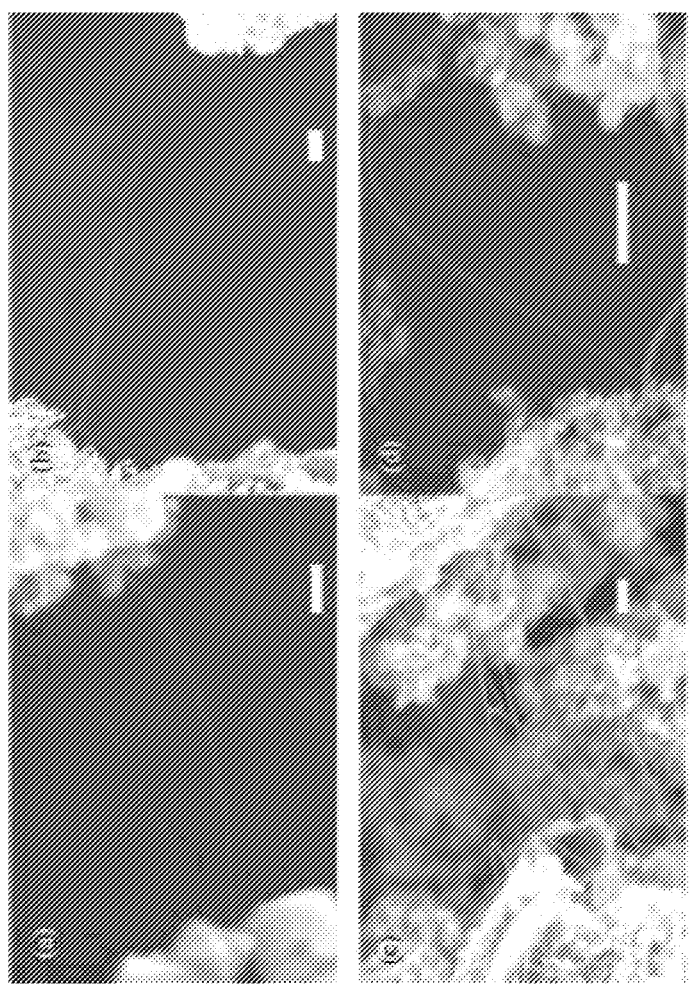
FIG. 2.3

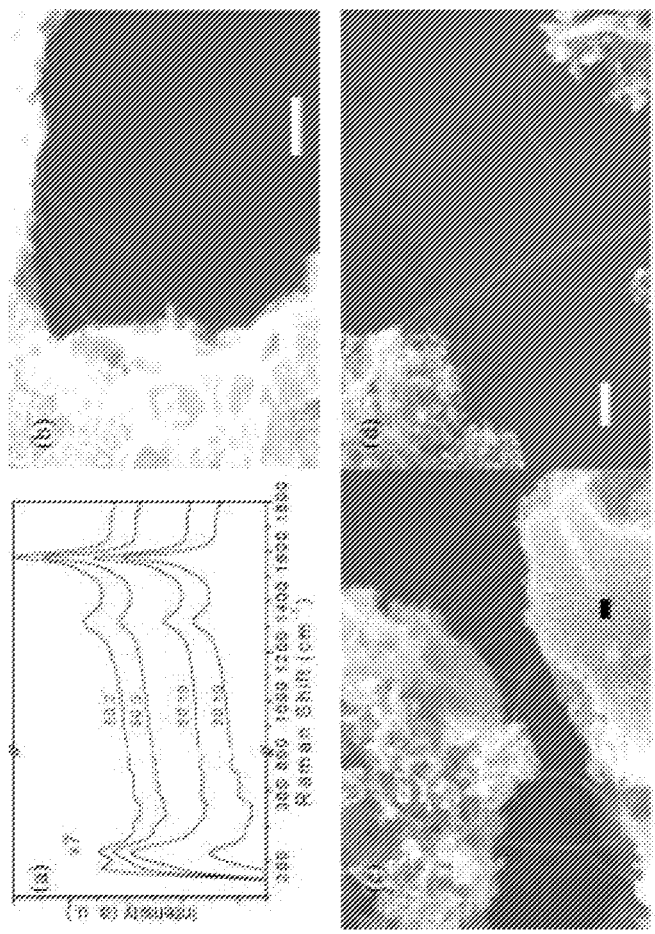
FIG. 2.4

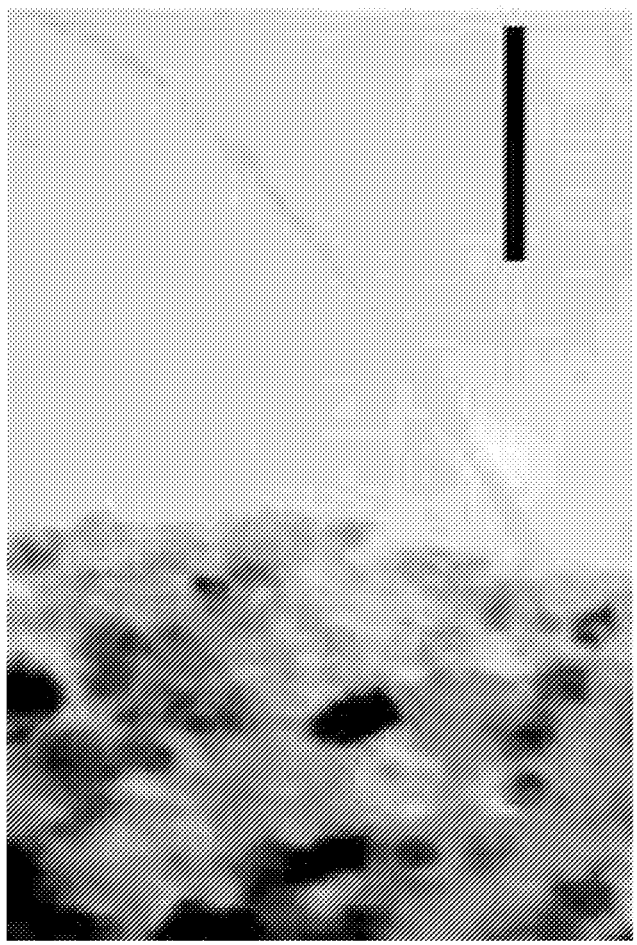
FIG. 2.5

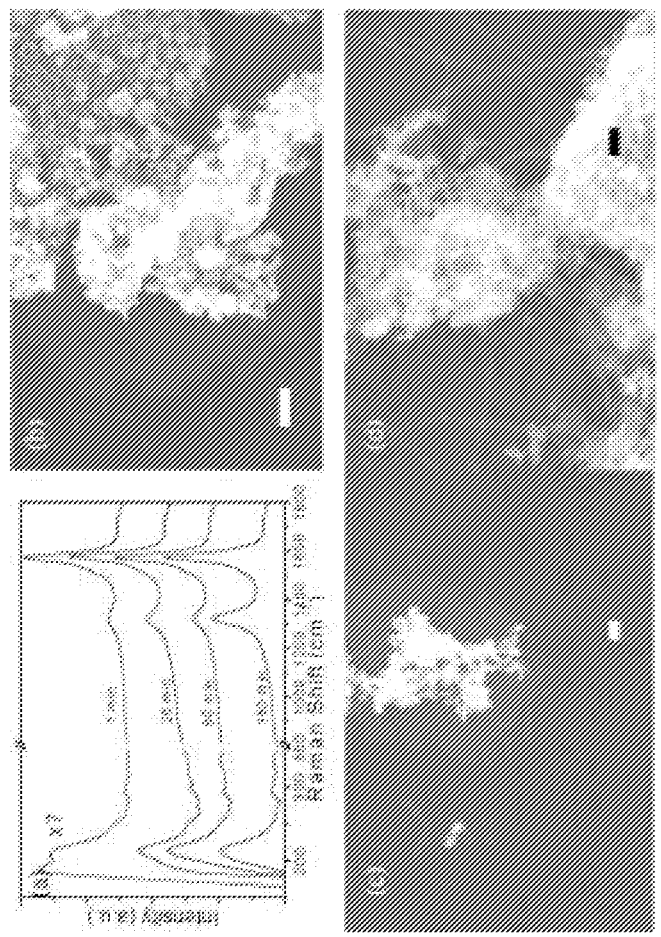
FIG. 2.6

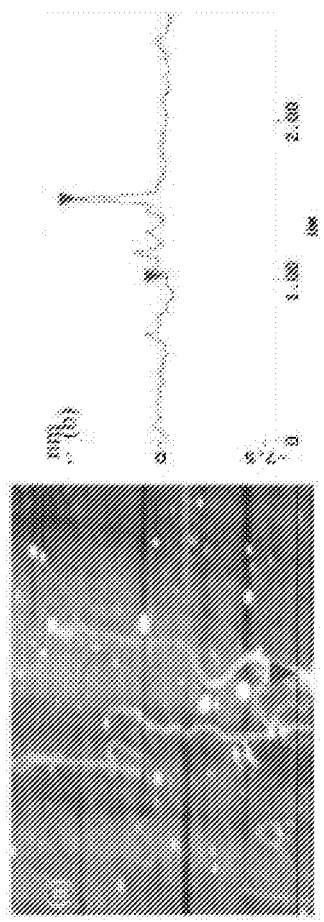
FIG. 2.7

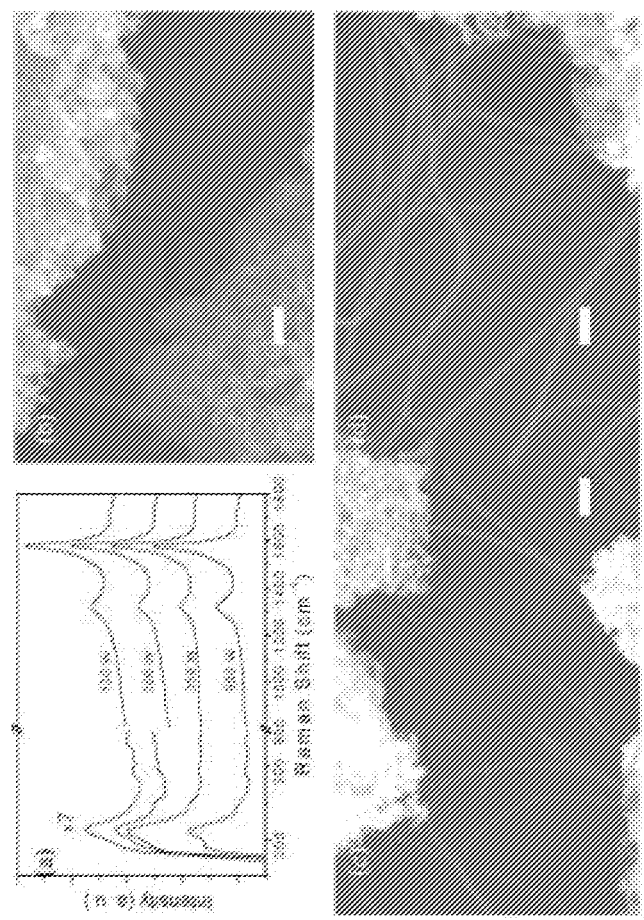
FIG. 2.8

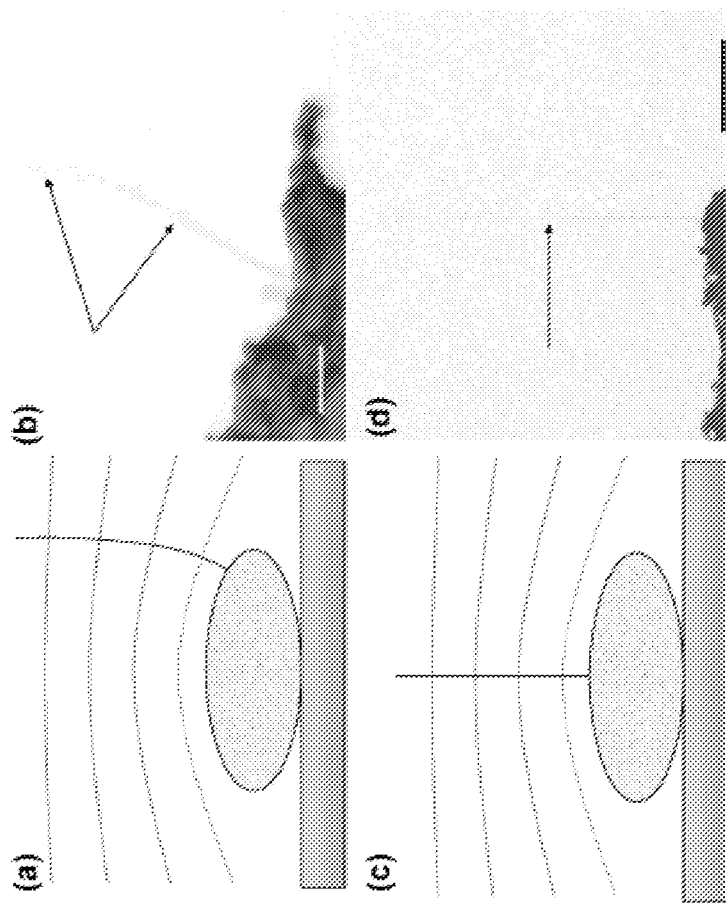
FIG. 3.1

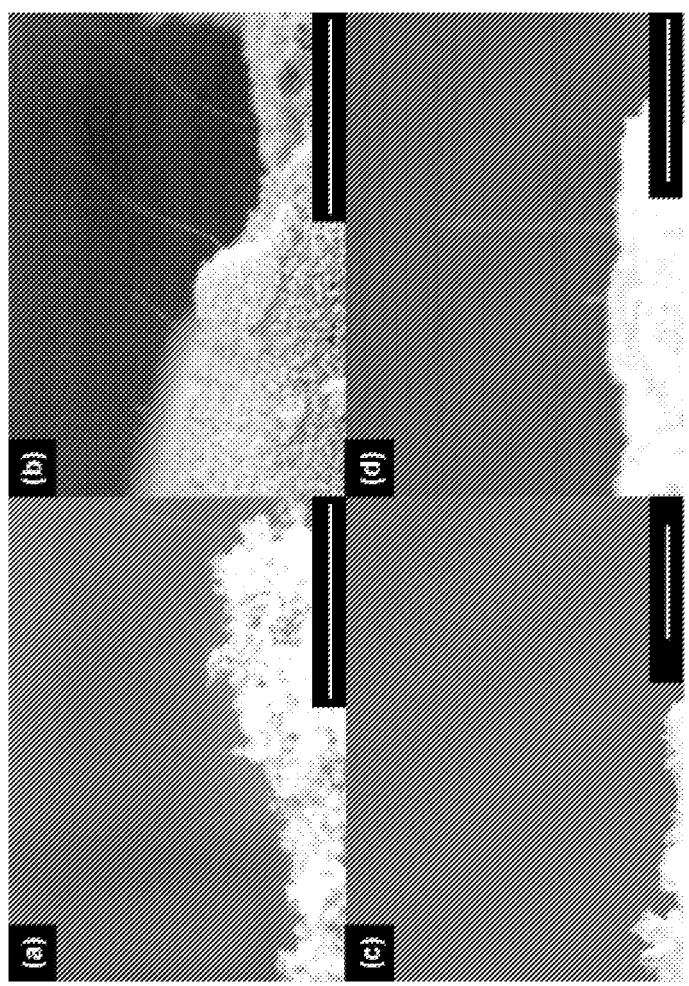
FIG. 3.2

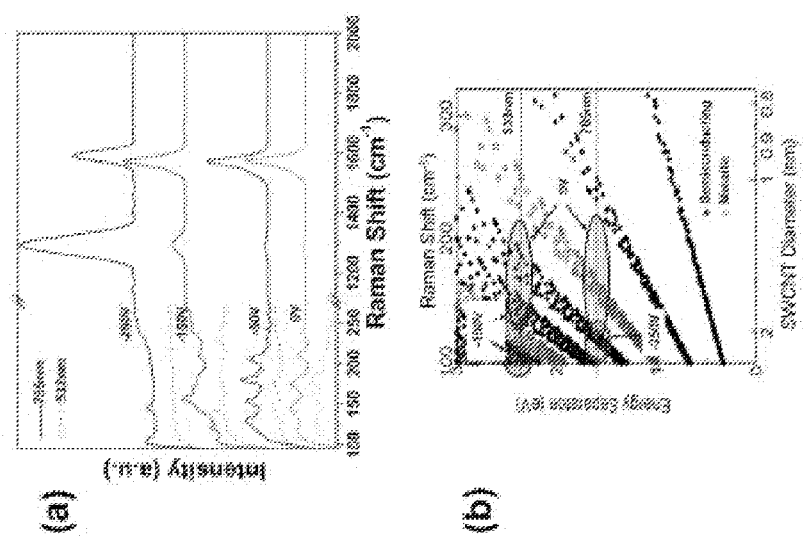
FIG. 3.3

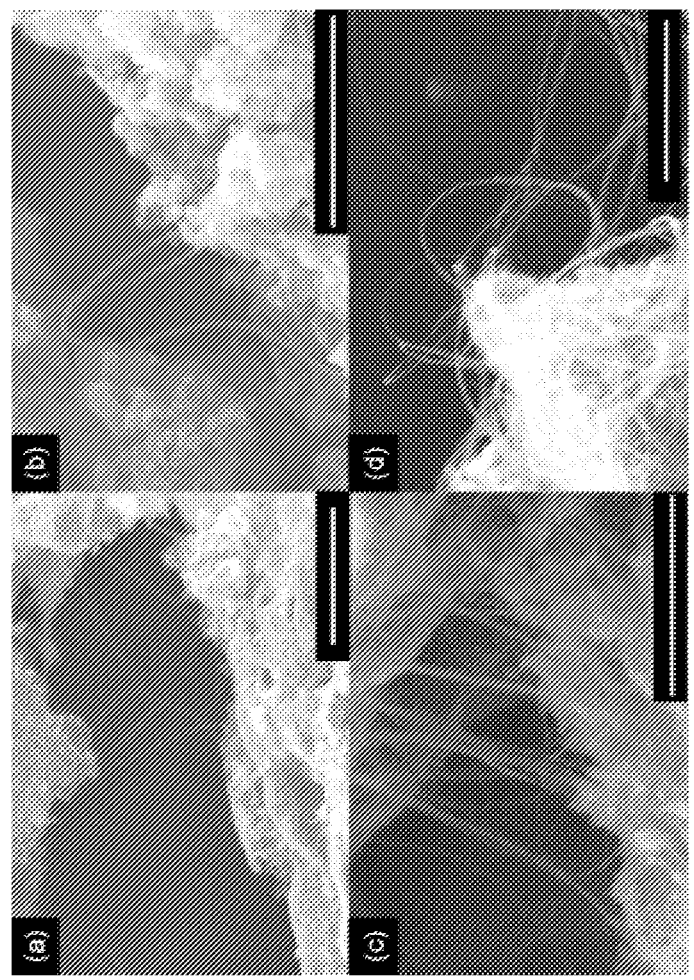
FIG. 3.4

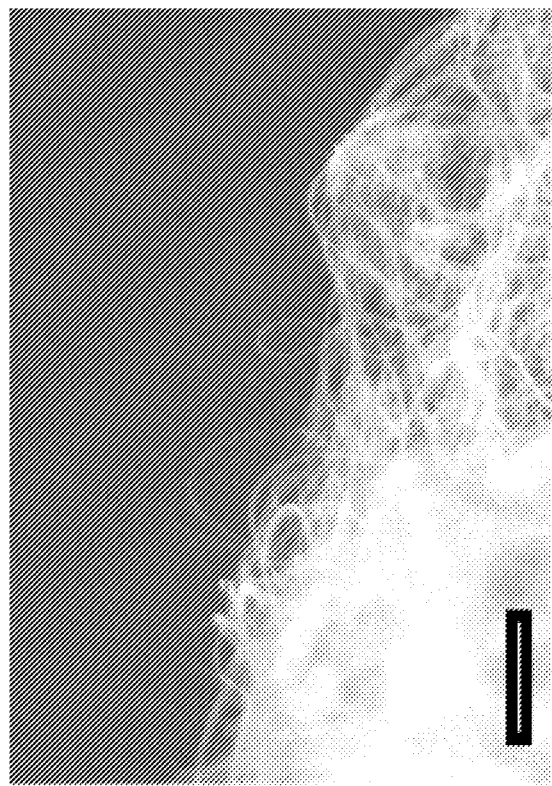
FIG. 3.5

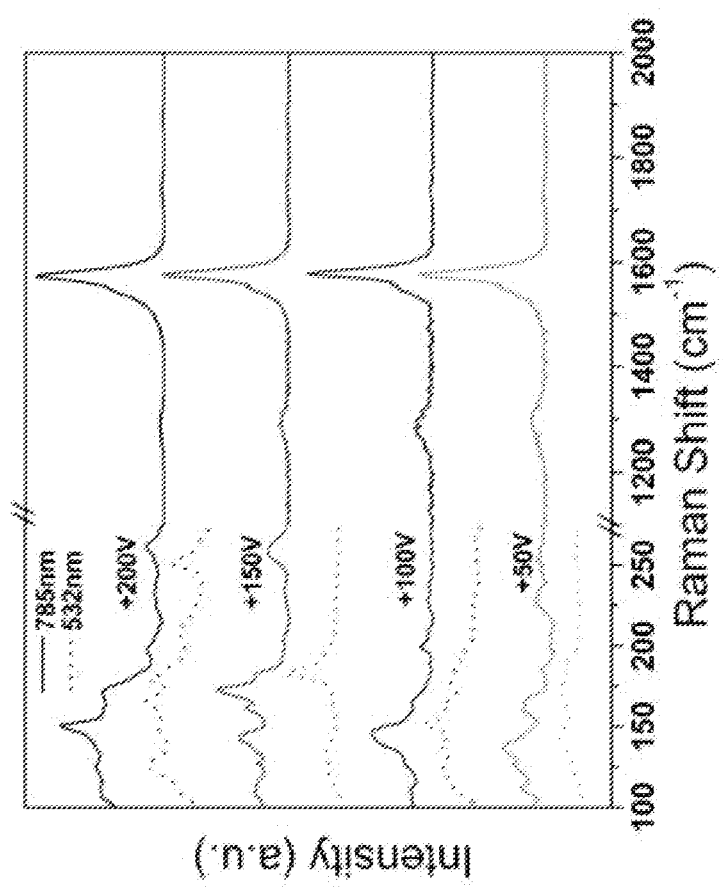
FIG. 3.6

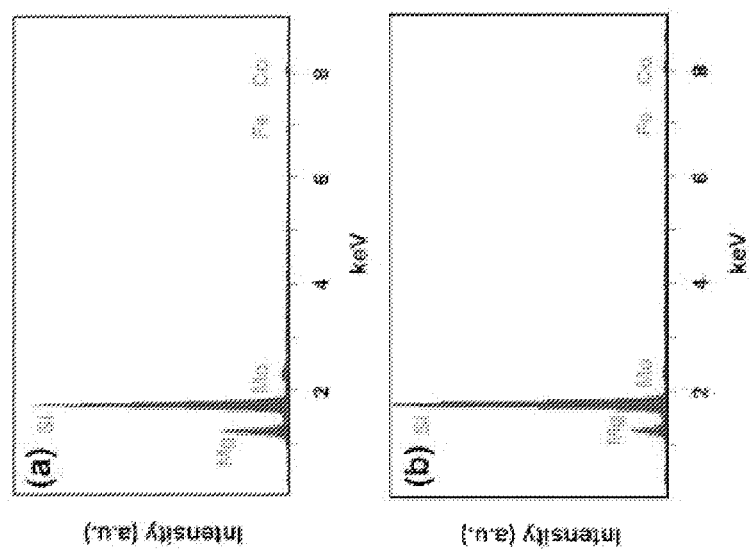
FIG. 3.7

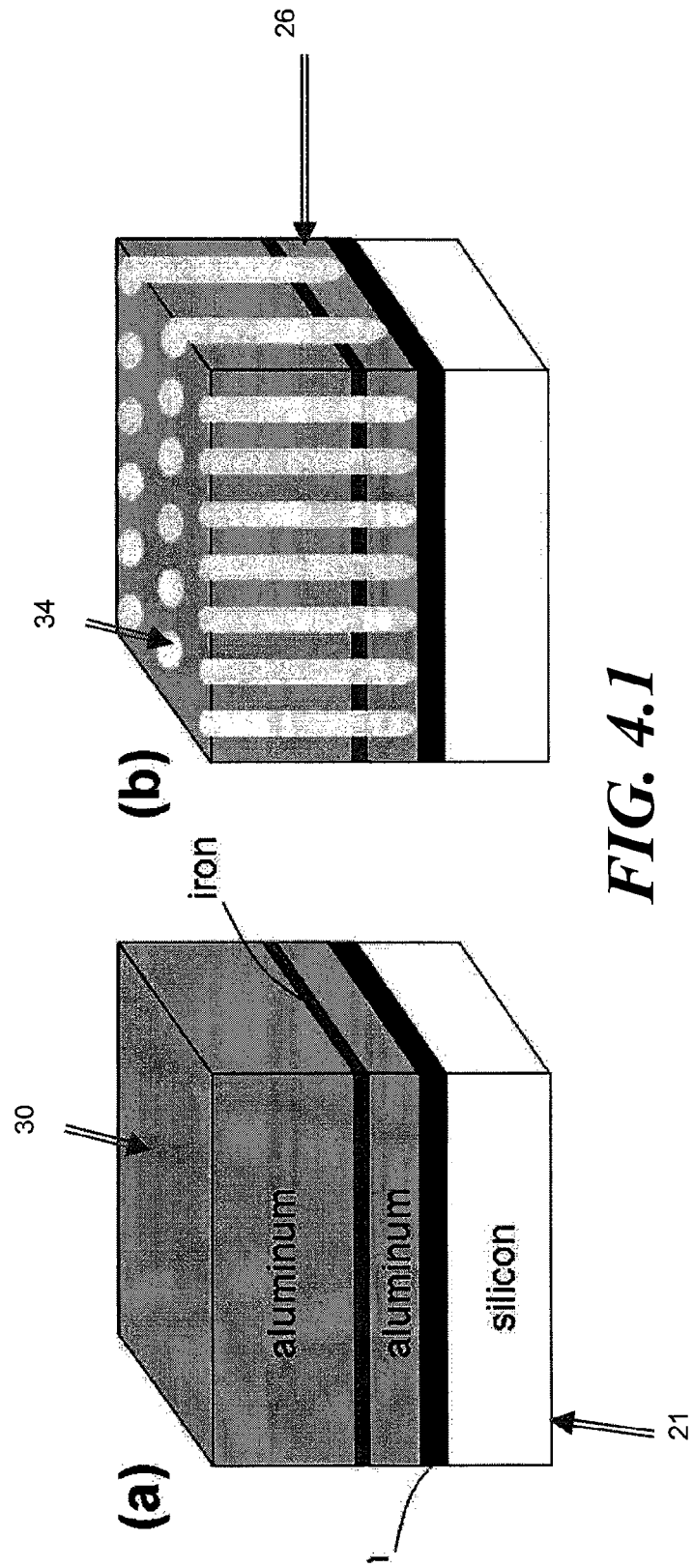
FIG. 4.1

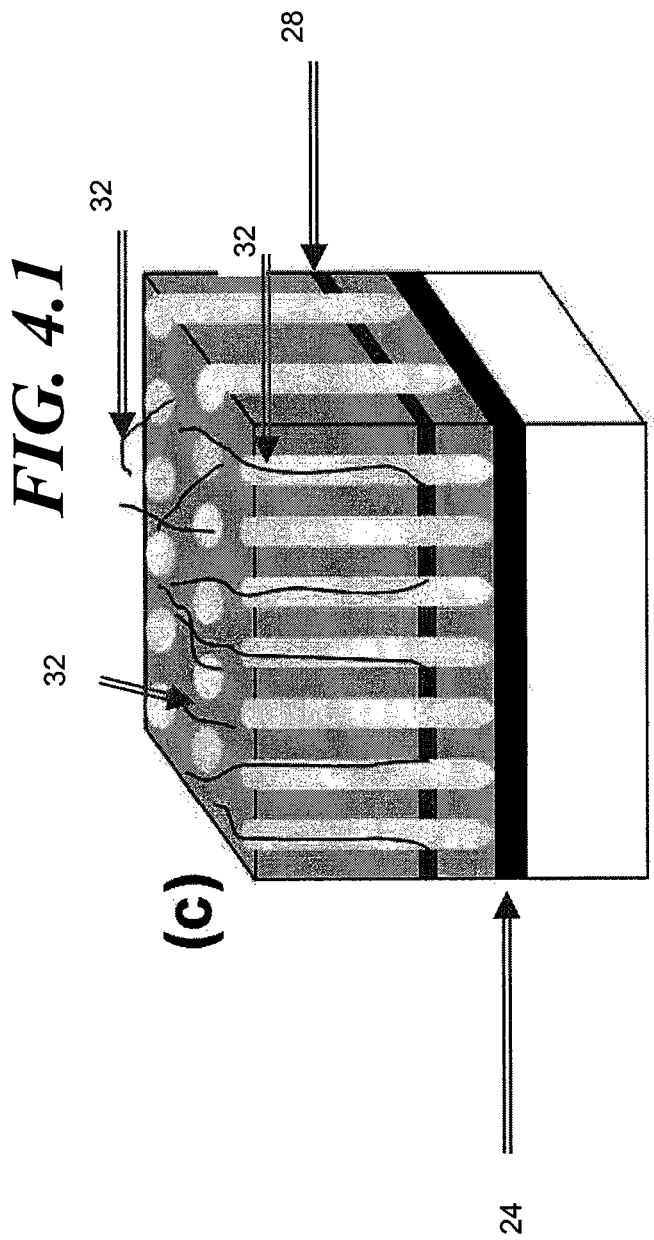

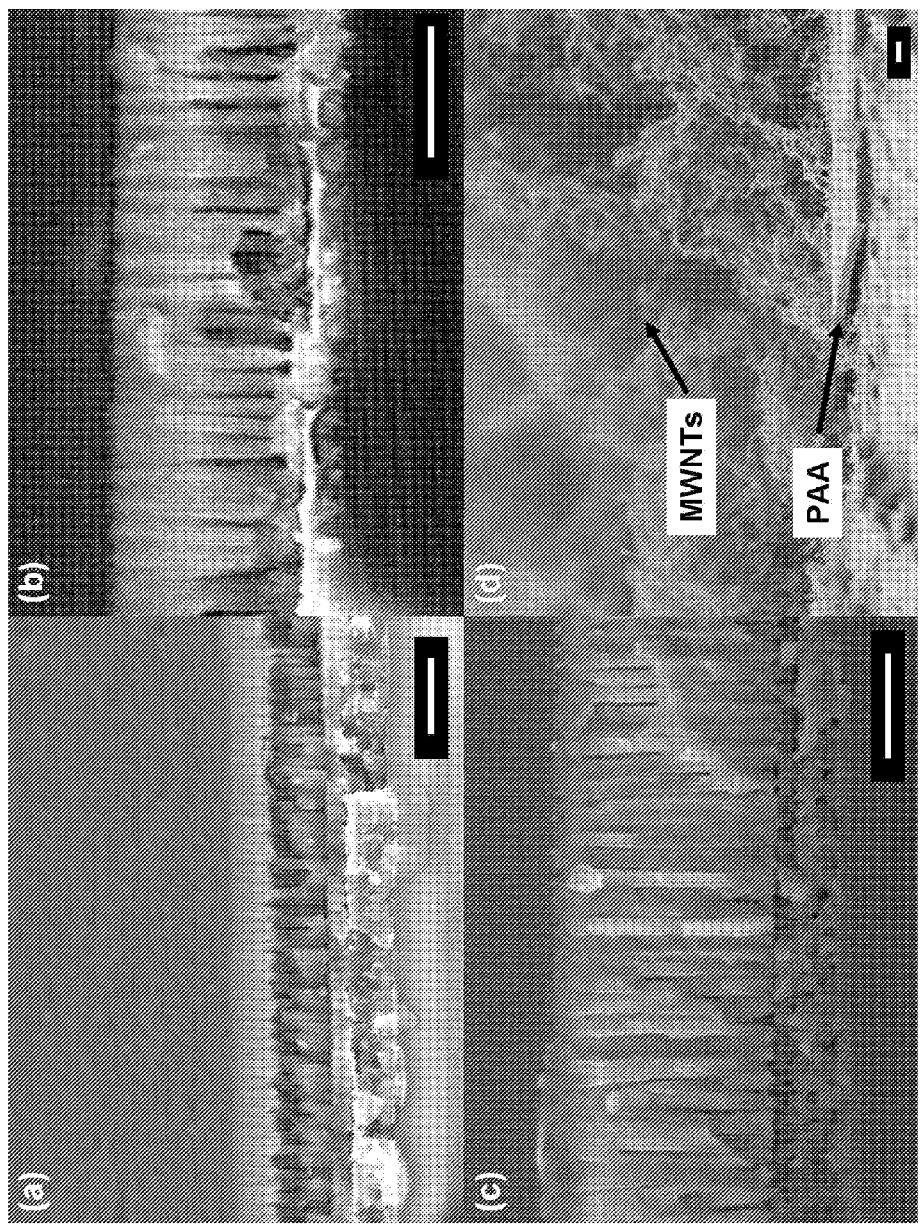
FIG. 4.2

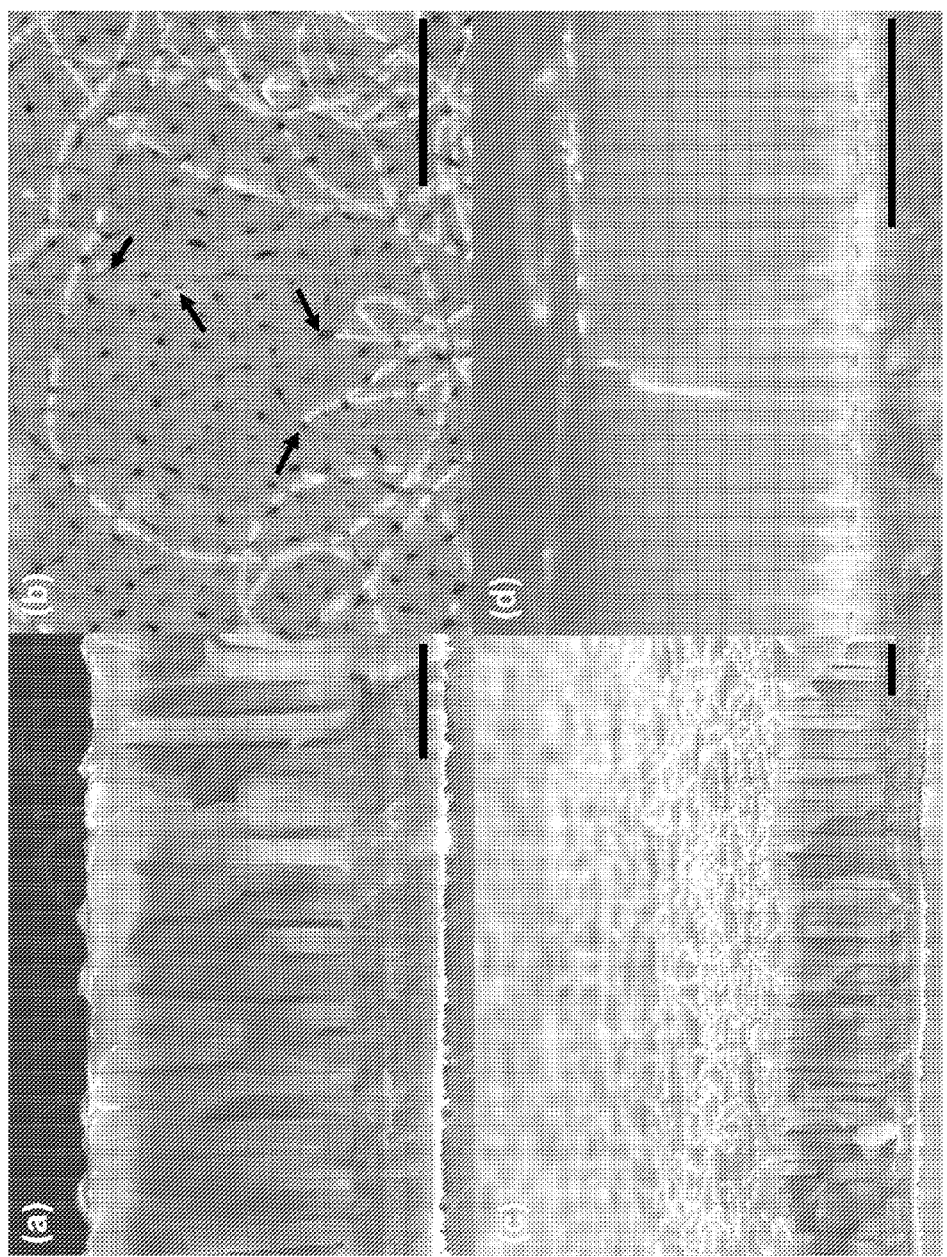
FIG. 4.3

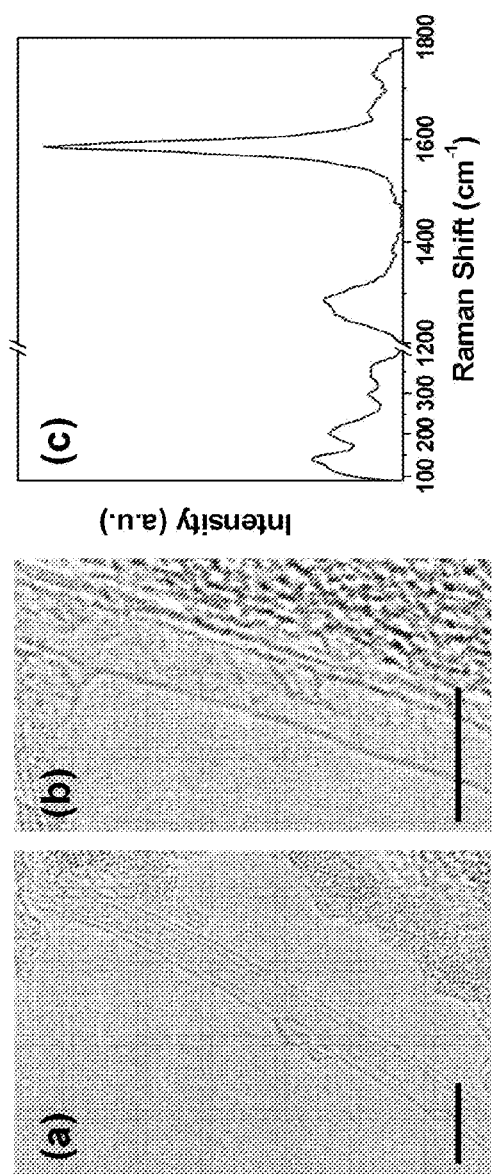
FIG. 4.4

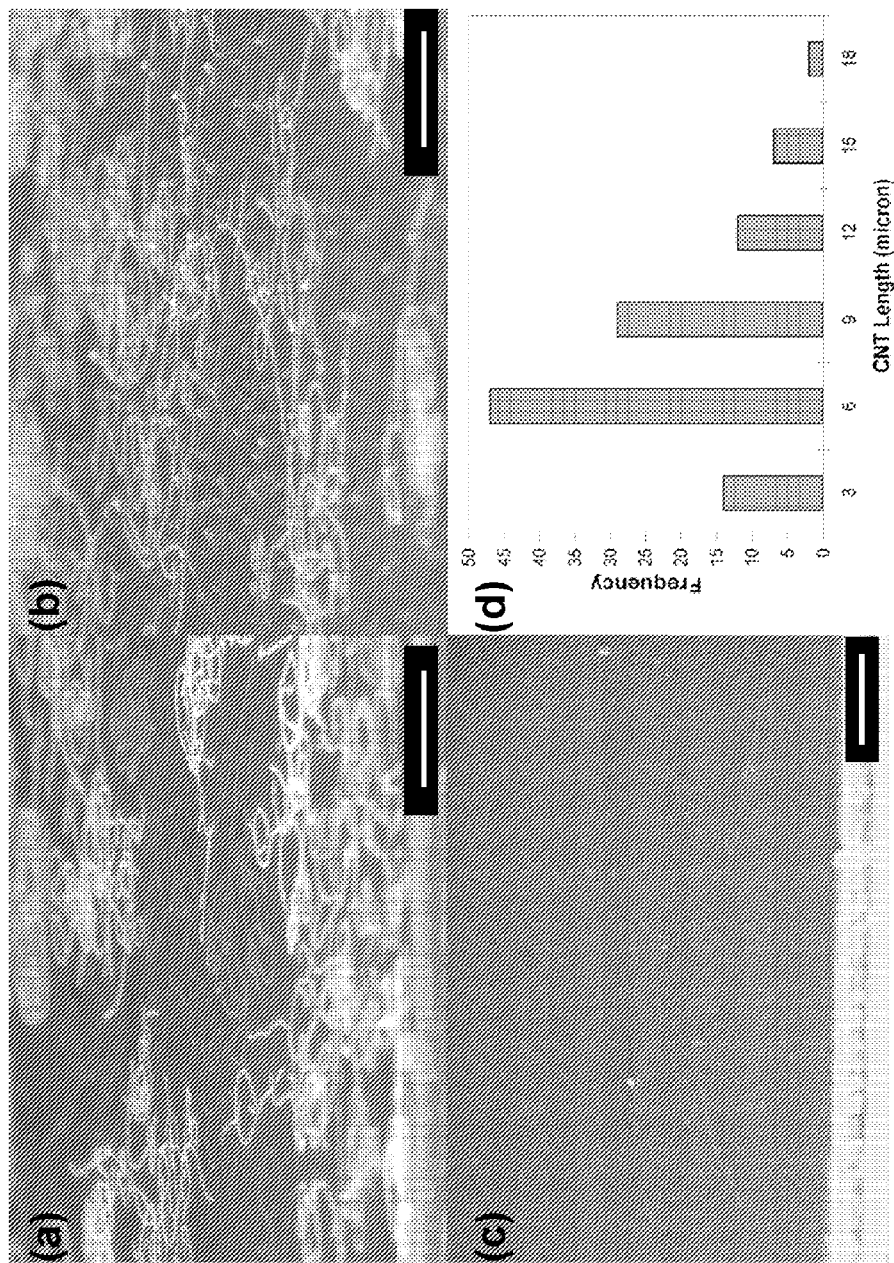
FIG. 5.1

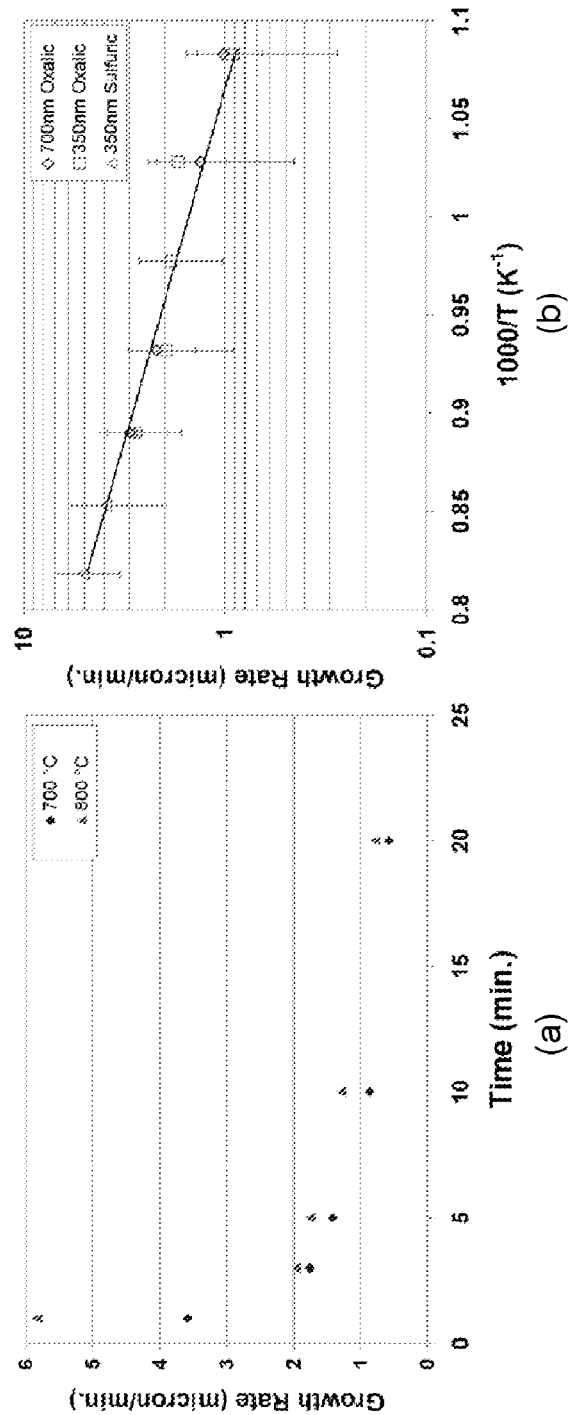
FIG. 5.2

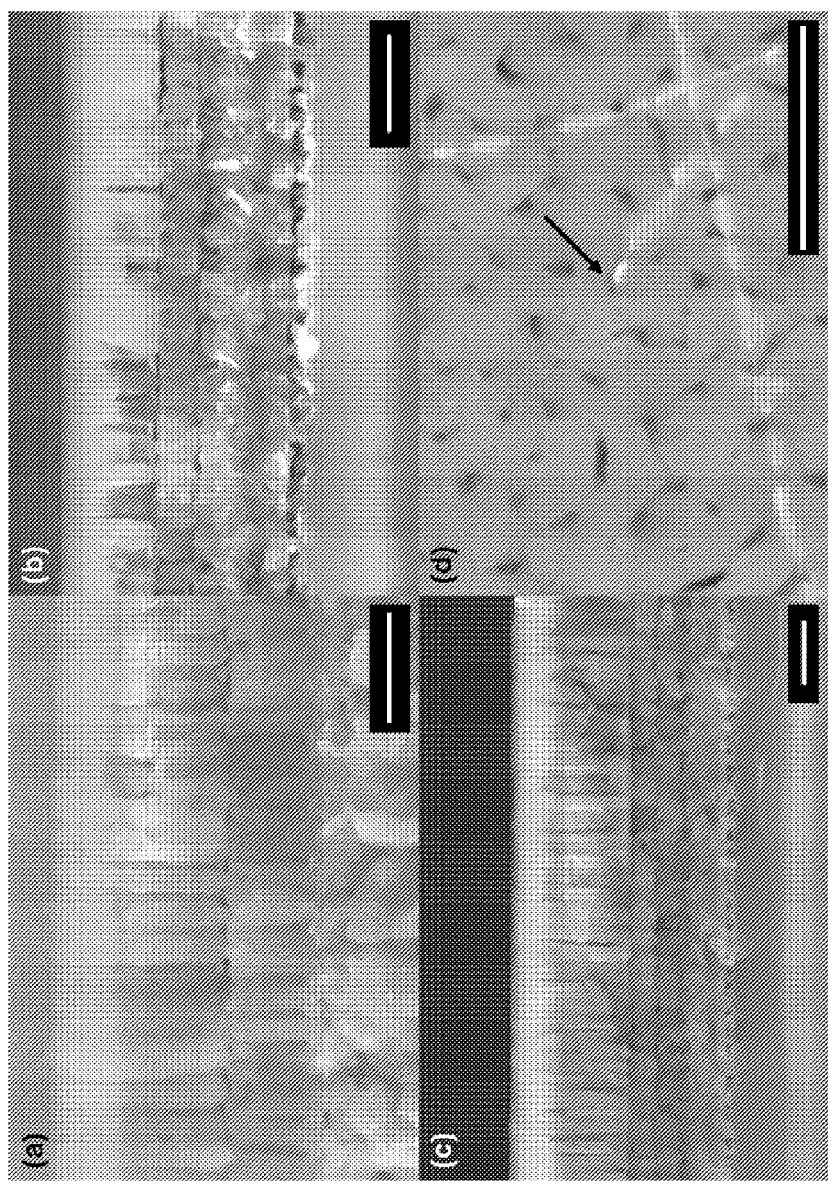
FIG. 5.3

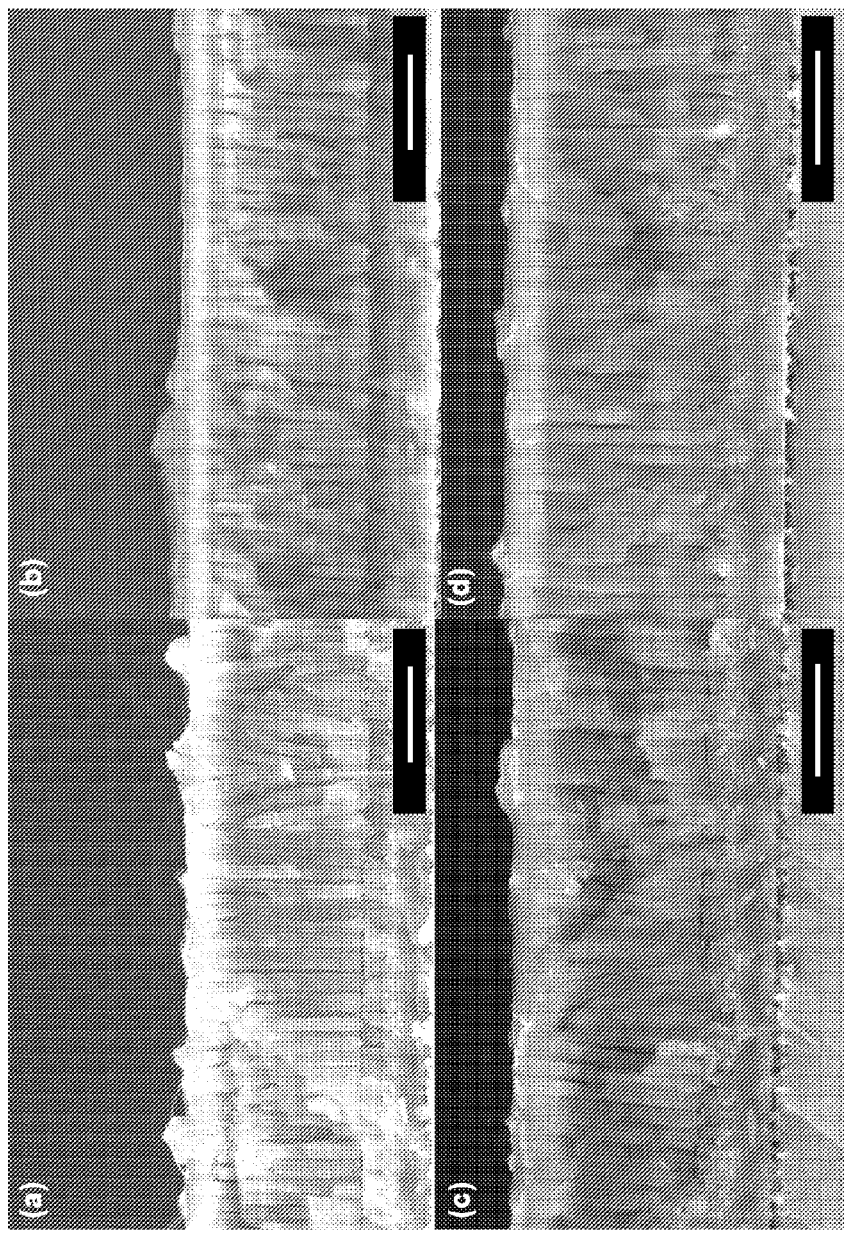
FIG. 5.4

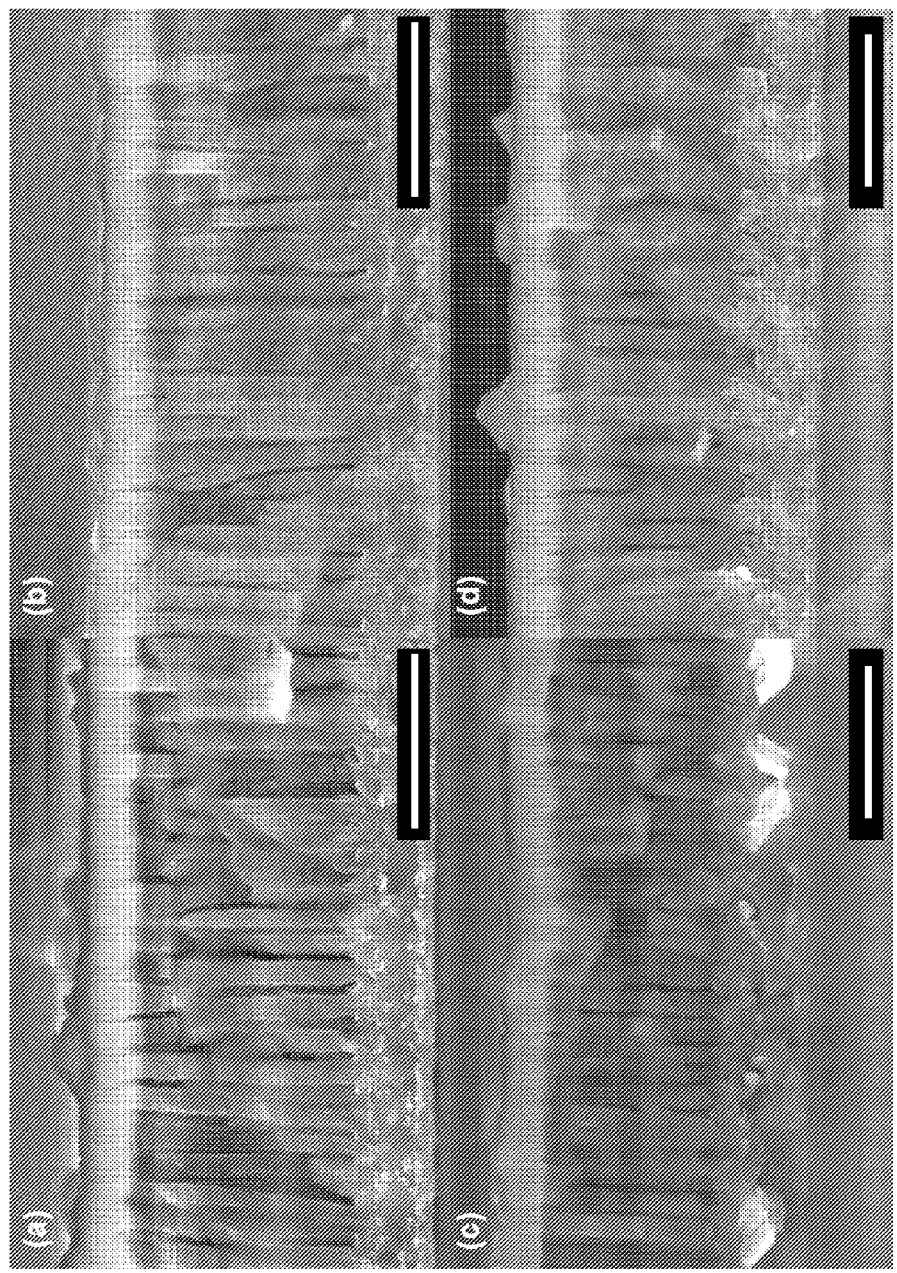
FIG. 5.5

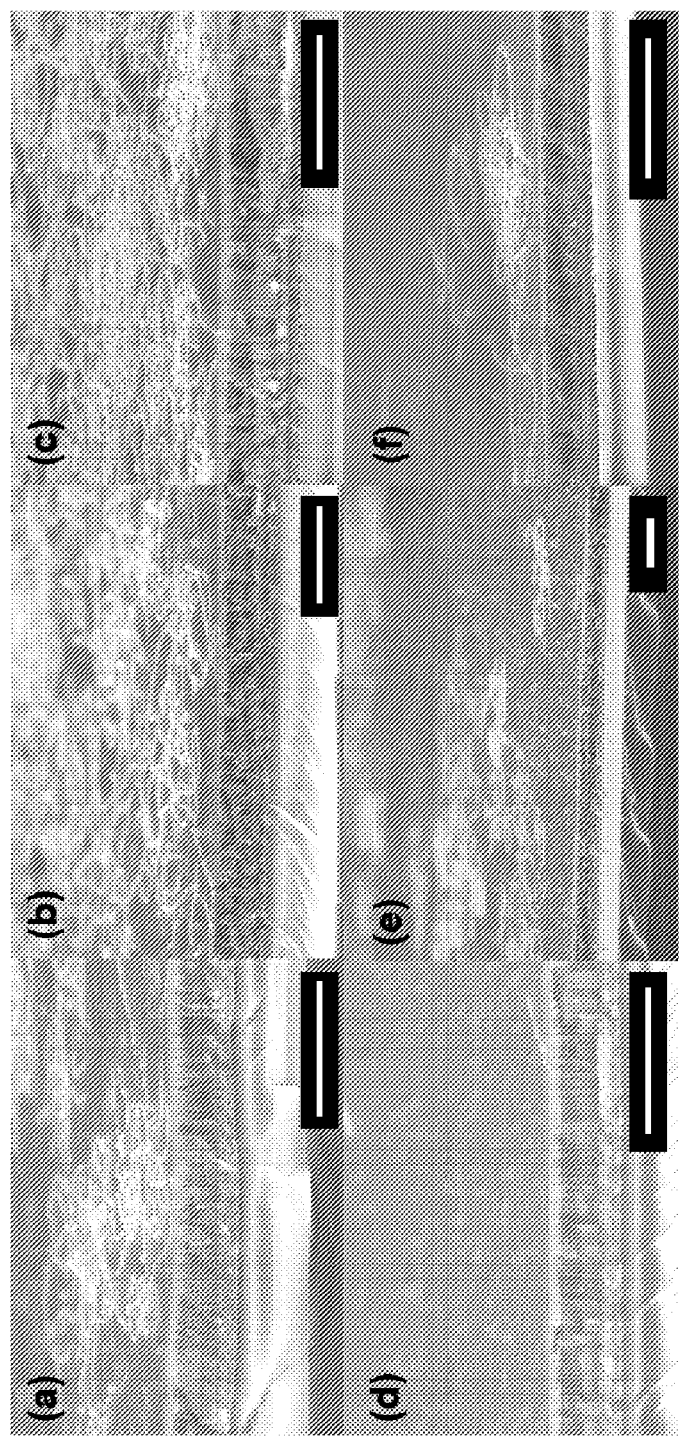
FIG. 5.6

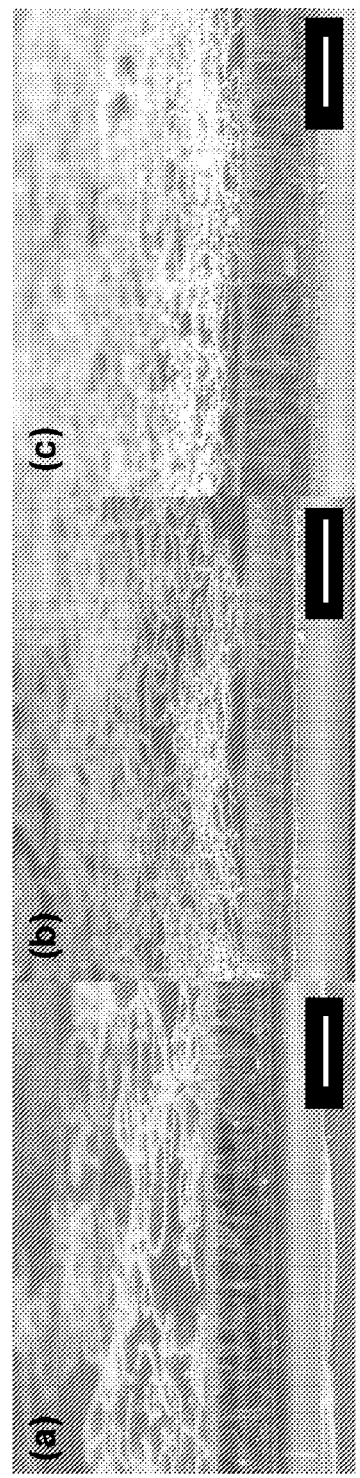
FIG. 5.7

VERTICAL CARBON NANOTUBE DEVICE IN NANOPOROUS TEMPLATES

CROSS REFERENCE TO RELATED APPLICATIONS

The present invention claims the benefit of priority to U.S. Provisional Patent Application Ser. No. 60/747,422, filed May 17, 2006; and also to U.S. Provisional Patent Application Ser. No. 60/887,695, filed Feb. 1, 2007; both of which are incorporated herein by reference.

GOVERNMENT RIGHTS

This invention was made with Government support under contract number NCC2-1363 awarded by NASA. The government has certain rights in the invention.

FIELD OF THE INVENTION

The present invention relates to the synthesis of carbon nanotubes (CNTs) in a nanoporous array, and more specifically to the synthesis of single-walled carbon nanotubes (SWCNTs) and double-walled carbon nanotubes (DWCNTs) in a nanoporous material.

BACKGROUND OF THE INVENTION

Single-walled and double-walled carbon nanotubes (SWNTs and DWNTs, respectively) possess excellent electronic and thermal transport properties while offering high strength. As such, they have been identified as excellent candidates for applications including electronics, thermal management, radiation sources, and biological sensors. SWNTs and DWNTs have commercial potential in electron emitters for flat panel displays, gas and biological sensors, metallic electrical interconnects, and semiconducting channels for field effect transistors. While "proof of concept" experiments and prototypes have verified the performance of SWNTs in these applications, full utilization of their potential has been hindered by the lack of a reliable platform upon which to manufacture devices and a lack of synthesis control. Many prototype devices (such as field effect transistors) rely on dispensing CNTs in solution upon functionalized substrates to bridge one or more CNTs across electrical contacts. Other applications, such as electron emission devices and electrical interconnects, often rely on largely uncontrolled growth of dense CNTs mats.

Carbon nanotubes (CNTs), first discovered in 1991 by Sumio Iijima, have become the subject of intense scrutiny from many scientific and engineering disciplines. CNTs are cylindrical carbon molecules composed of one or more conjoined graphitic layers (called graphene sheets). CNTs having only one graphene shell are called single-walled carbon nanotubes (SWNTs), while those having multiple concentric shells are called multi-walled carbon nanotubes (MWNTs). SWNTs have a typical diameter ranging from 1-3 nm, while MWNTs may have diameters of up to tens of nanometers. One type of MWNT is double-walled CNTs (DWNTs), as they typically have dimensions, physical properties and electrical properties similar to those of SWNTs.

SUMMARY OF THE INVENTION

Some embodiments of the present invention pertain to an apparatus having a non-electrically conducting layer that includes a plurality of vertical nanopores. In some embodiments, the apparatus includes a second layer having a catalyst for synthesis of carbon nanostructures. Yet other embodiments include a carbon nanotube in each of the plurality of nanopores and the nanotube consists of two or fewer walls.

Another embodiment of the present invention relates to a method comprising placing a first layer of material on a substrate and placing on the first layer a catalyst for synthesis of carbon nanostructures. The embodiment further includes creating a plurality of nanopores in the first layer and a catalyst; and synthesizing with the catalyst a carbon nanostructure in each of the nanopores.

Another embodiment of the present invention relates to a method comprising placing a first layer of a material on a substrate and placing on the first layer a catalyst for synthesis of carbon nanostructures. The embodiment also includes diffusing the catalyst into the first layer, and synthesizing with the catalyst a carbon nanostructure.

Yet another embodiment of the present invention relates to a method comprising placing a first layer of a material on a substrate and placing on the first layer a catalyst for synthesis of carbon nanostructures. The embodiments further includes placing the substrate with the material and the catalyst in a chamber having an organic material in the vapor phase and a plasma, electrically biasing the substrate relative to the walls of the chamber, and synthesizing with the catalyst a carbon nanostructure in each of the nanopores during said biasing.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these myriad combinations is excessive and unnecessary.

These and other features and aspects of different embodiments of the present invention will be apparent from the claims, specification, and drawings.

DESCRIPTION OF THE DRAWINGS

FIG. 2.1 is a schematic representation of a microwave PECVD reactor according to one embodiment of the present invention.

FIG. 2.2 is a graphical representation of a Raman spectra averaged over five locations for various susceptor temperatures.

FIG. 2.3 shows images of FESEM micrographs showing effect of susceptor temperature. (a) 700° C.,(b) 800° C., (c) 900° C., (d) 950° C. Scale bar=100 nm.

FIG. 2.4 shows the effect of gas composition. (a) Raman spectra of gas composition study (RBMs inset). FESEM image of hydrogen:methane ratios of (b) 50:2, (c) 50:10, (d) 30:10. Scale bar=100 nm.

FIG. 2.5 shows images taken by a TEM micrograph of SWNT bundle grown at standard conditions and 50:10 (hydrogen:methane) gas composition. Scale bar=50 nm.

FIG. 2.6 shows the effect of synthesis time. (a) Raman spectra. Typical FESEM images representing times of (b) 1 min. (c) 60 min., (d) 180 min. Scale bar—100 nm.

FIG. 2.7 shows: (a) AFM image of individual SWNTs and SWNT bundles and (b) Height data for cross-sectional line drawn on (a).

FIG. 2.8 shows the effect of plasma power (a) Raman spectra of plasma power study (RBM inset). FESEM images for plasma powers of (b) 130 W, (c) 350 W, (d) 500 W. Scale bar—100 nm.

FIG. 3.1 shows the effect of negative substrate bias (a) Schematic of and (b) cross-sectional image of SWNT synthesized using −200 V substrate bias originating on the side of a support particle (scale bar=50 nm) and growing perpendicularly to electric field lines (c) Schematic of and (d) cross-sectional FESEM image of SWNT synthesized at −200 V substrate bias originating from a flat support particle surface (scale bar=200 nm).

FIG. 3.2 shows cross-sectional FESEM images of SWNTs synthesized using (a) −100 V, (b) −150 V, (c) −200 V, and (d) −250 V substrate bias. Sale bar=200 nm.

FIG. 3.3 shows (a) Raman spectra of SWNTs grown at negative substrate bias using 785 nm and 532 nm excitation wavelengths. (b) Kataura plot depicting resonant SWNT RBMs.

FIG. 3.4 shows a FESEM image of SWNT synthesized using (a) +50 V, (b) +100 V, (c) 150 V, and (d) +200 V substrate bias. Scale bar=400 nm.

FIG. 3.5 shows a cross-sectional FESEM image of SWNTs synthesized using +200 V substrate bias. Sale bar=250 nm.

FIG. 3.6 shows Raman spectra of SWNTs grown using positive substrate bias using 785 nm and 532 nm excitation wavelengths FIG. 3.7 shows EDS spectra of SWNT and substrate (a) Sample synthesized without applied bias. (b) Sample synthesized using +200 V applied bias.

FIG. 4.1 is a schematic of porous anodic Al—Fe-al preparation and CNT synthesis procedure according to one embodiment of the present invention. (a) Initial deposited film structure. (b) Anodized film structure. (c) CNTs synthesized from pore channels FIG. 4.2 shows alternative material selections for nanoporous template according to other embodiments of the present invention. (a) 5 nm Co catalyst layer, (b) 10 nm Pd catalyst layer, and (c) 10 nm Ni catalyst layer after PECVD synthesis. (d) MWNTs synthesized as a result of Pd conductive layer under anodized film. Scale bar=500 nm.

FIG. 4.3 shows FESEM images of nanoporous template and CNTs: (a) Cross-sectional viewing showing vertical alignment of some CNTs. (b) Top PAA surface showing CNTs emerging from pores. (c) Titled cross-sectional view of template and CNTs. (d) Cross-sectional view showing CNT initiating from catalyst layer. The deposited film structure was (SiO_/Ti/Al/Fe/Al) 50/150/100/2/700 nm for (a)-(c) and 50/150/200/3/500 for (d). Samples (a) and (c) were anodized in 0.3 M oxalic acid at 80 V, while (b) and (d) were anodized at 40 V. Sample (d) underwent 0.1 M $H_3PO_4$ pore widening. Scale bar=500 nm.

FIG. 4.4 shows HRTEM image of a (a) DWNT and (b) SWNT grown from porous anodic Al—Fe—Al template. (c) Raman spectra of CNTs grown from nanoporous Alumina template containing 1 nm Fe layer. Scale bar=5-nm.

FIG. 5.1 shows CNT growth at 850° C. for 3 minutes using porous anodic Al—Fe—Al structures. Tilted FESEM micrographs of (a) 350 nm and (b) 700 nm top alumina layer anodized using oxalic acid and (c) 350 nm top alumina layer anodized using sulfuric acid. (d) Histogram of CNT length for sample with 700 nm top alumina layer anodized using oxalic acid. Sale car=2 microns.

FIG. 5.2 shows CNT growth rate for porous anodizic Al—Fe—Al structures. (a) Average growth rate for 350 nm top alumina layer film anodized in oxalic acid at 700 and 800° C. (b) Arrhenius plot of average growth rate for structures after 3 minute synthesis time.

FIG. 5.3 shows the effect of multiple Fe layers. Cross-sectional FESEM images of a (a) single, (b) double, and (c) triple 0.5 nm FE layer. (d) FESEM top view of porous template utilizing triple 0.5 nm Fe layer showing CNT emerging from pore. Scale bar=300 nm.

FIG. 5.4 shows cross-sectional FESEM images showing effect of pre-anodization thermal diffusion on 2 nm Fe catalyst layer. Diffusion conditions include 450° C. for (a) 20 minutes and (b) 60 minutes and 500° C. for (c) 20 minutes and (d) 60 minutes. Scale bar=500 nm.

FIG. 5.5 is cross-sectional FESEM images showing effect of pre-anodization thermal diffusion on 0.5 nm Fe catalyst layer. Diffusion conditions include 450° C. for (a) 20 minutes and (b) 60 minutes and 500° C. for (c) 20 minutes and (d) 60 minutes. Scale bar=500 nm.

FIG. 5.6 shows a comparison of CNT density for various Fe layer thicknesses. Cross-sectional FESEM images of samples having undergone pre-anodization 500° C. thermal diffusion for 20 minutes incorporating (a) 0.5 nm, (b) 1.0 nm, and (c) 2.0 nm Fe layers. Cross-sectional FESEM images of samples without pre-anodization thermal diffusion with samples incorporating (d) 0.5 nm, (b) 1.0 nm, and (c) 2.0 nm Fe layers. Scale bar=1 micron.

FIG. 5.7 shows cross-sectional FESEM images showing effect of porous anodic template containing multiple 0.5 nm Fe layers after undergoing 500° C. pre-anodization for 20 minutes. (a) One Fe layer. (b) Two Fe layers separated by 100 nm Al. (c) Three Fe layers, each separated by 100 nm Al. Scale bar=1 micron.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

To increase the performance of electronics devices, the semiconductor industry continues to increase the spatial density of electronic devices. Some of the embodiments of the invention described herein incorporate vertical alignment of single-walled or double-walled carbon nanotubes from individual nanoscale pores having the diameter of 10-50 nm. Other embodiments include the processing steps required to create a functional electronic device. Such a structure allows for an ultra-high number density of electronic devices.

Vertical single-walled carbon nanotubes (SWCNTs) or vertical double-walled carbon nanotubes (DWCNTs) are grown from a catalyst imbedded into the walls of a nanoporous structure similar to porous anodic alumina (PAA) (also known as anodized aluminum oxide (AAO)) to serve as a vertically oriented channel for an electronic device. A SWCNT catalyst is integrated directly into the nanoporous channel wall structure, allowing for direct synthesis of SWCNT from the structure without further processing. The nanoscale alumina pore structure offers electrical isolation of adjacent devices as well as a structure in which post processing of the SWCNT channel can proceed, including the addition of a gate dielectric material, gate contact metal, and CNT source and drain metallic contacts.

Because the SWCNT device channel is oriented perpendicular to the substrate, an ultra-high density of electronic devices is possible. A device incorporating SWCNT as electronic channels would conduct electrical current with low resistance, leading more efficient and cooler running electronics. Vertically oriented multi-walled carbon nanotube (MWCNT) devices have been reported in the literature; however, the distinction between MWCNT and SWCNTs is not subtle. MWCNTs do not share the same electronic, mechanical, or thermal properties of SWCNTs and DWCNTs, and are of larger diameter.

Templated growth of SWCNTs in nanoscale alumina pores allows for vertical orientation of SWCNTs due to spatial confinement, drastically increasing the allowable number density of SWCNT devices when compared to horizontally oriented devices. The catalyst structure allow for synthesis of single-walled CNTs rather than multi-walled CNTs, as has been reported by other catalyst structures embedded in PAA for CNT synthesis.

The result of this catalyst structure is the ability to synthesize single-walled carbon nanotubes (SWCNTs) in a vertical orientation within the PAA pores, creating the possibility for an extremely high number density of individually addressable SWCNTs. Conventional processing of the SWCNTs in the template structure adds an electrostatic gate and electrical contacts.

CNTs are important engineering materials due to their beneficial mechanical, thermal, and electrical properties. Although the elastic properties of CNTs are difficult to define because of ambiguities associated with measuring their cross-sectional area, generally accepted values for tensile strength and Young's modulus for individual SWNTs are approximately 30 GPa and 1 TPa, respectively. A recently published report indicates a tensile strength of 1.2 GPa and a Young's modulus of 16 GPa for aligned strands of DWNTs. The predicted thermal conductivity values for SWNTs at room temperature are as high as 6,600 W/m-K, while experimentally measured values range from approximately 150 W/m-K for SWNT bundles to as high as 10,000 W/m-K for individual SWNTs at room temperature. More recently, a thermal conductivity of a suspended SWNT yielded a thermal conductivity of 3,500 W/m-K at room temperature, with a conductivity that decreases with a scaling factor greater than $1/T$ for high temperature measurements up to 800 K. Additionally, measured values as high as 830 W/m-K are reported for MWNTs. Ballistic electronic transport has been measured in SWNTs, DWNTs, and MWNTs at room temperature, with SWNTs and DWNTs exhibiting ballistic behavior at a length of hundreds of nanometers to several microns. Experimentally measured current densities in SWNTs are on the order of $10^9$ amp/cm$^2$ and as high as $10^7$ amp/cm$^2$ in MWNTs. Although MWNTs are metallic in nature, SWNTs and DWNTs may be either metallic or semiconducting depending on their lattice structure, making them good candidates for electronic devices.

Because their diameter is significantly less than current semiconductor scaling metrics and because of their excellent electronic transport capabilities, SWNT- and DWNT-based nanoelectronic devices have been proposed and demonstrated. For example, SWNT-based field-effect transistors (FETs) that operate with ballistic electronic transport at room temperature have been reported [18] at length scales of several hundred nanometers, allowing for efficient device operation. DWNT FET devices may exhibit either unipolar or ambipolar characteristics. Similar to conventional semiconducting devices, chemical doping of SWNT channels has been successful for both p-type and n-type doping, allowing for tunable electronic elements. Large scale, efficient synthesis of SWNT and DWNT-based devices is a significant challenge, however. The SWNT and DWNT-based FET structures reported in literature to date are horizontally defined, with source, drain, and gate structures lithographically applied.

Typical methods for CNT synthesis include the laser ablation method, which utilizes a high power laser pulse to vaporize a graphite target; the arc discharge method, which employs a high current electric arc between carbon electrodes; and chemical vapor deposition (CVD) methods, including plasma-enhanced CVD (PECVD), which utilize transition metal particles and hydrocarbon gasses to catalyze CNTs. All of these methods require synthesis temperatures of several hundred to over a thousand degrees Celsius at the CNT growth surface. The vapor deposition methods explicitly require transition metal catalyst particles to facilitate CNT growth, while the laser ablation and arc discharge targets may be impregnated with transition metal particles to increase selectivity to SWNTs. For in situ device realization, CVD and PECVD methods are preferred, as they allow for a controlled and uniform synthesis of CNTs on substrates pre-patterned with catalyst films or particles.

PECVD synthesis, in particular, is an attractive method for CNT growth due to its relatively low synthesis temperatures and its ability to vertically align CNTs due to plasma sheath effects. Recent experiments have reported SWNT synthesis as low as 400° C. using PECVD, compared to 900-1100° C. typically required for thermal CVD synthesis. Analytical studies indicate that the dissociation of carbon precursors at the catalyst particle is the limiting process for thermal CVD synthesis of CNTs, whereas with PECVD methods, which dissociate carbon precursors in the synthesis plasma, this step is bypassed. As a result, CNT synthesis using PECVD, likely incorporating surface carbon diffusion on the catalyst particle as the main diffusion mechanism, may proceed at temperatures drastically lower than those required for thermal CVD. In fact, experimentally measured activation energies for PECVD synthesis of CNTs, ranging from 0.3-0.5 eV, agree well with the theoretically obtained energy required for carbon surface diffusion on Ni of 0.4 eV. For comparison, experimentally obtained activation energies for thermal CVD synthesis of CNTs are approximately 1.2 eV, which compares favorably with both the calculated dissociation energies of 1.2 and 0.9 eV required for $C_2H_2$ and $CH_4$, respectively, on a Ni particle and with the calculated energy required for bulk carbon diffusion through the particle, 1.6 eV.

The templated synthesis of CNTs may be advantageous for device integration, as it enables the growth of CNTs in designated locations. Post processing of the CNTs to form functional devices in situ may proceed with high efficiency by using a template, rather than by chance, as is often a consequence of bulk CNT device synthesis. One such nanoscale template that has demonstrated long-range order is porous anodic alumina (PAA). PAA enables the formation of an ultra-high density of vertical pores, on the order of $10^{10}$ pores/cm$^2$ (using 40 V potential in 0.3 M oxalic acid), and may be synthesized using films with thicknesses of several hundred nanometers to many microns. As such, the use of PAA for templated CNT synthesis produces inherently vertical CNTs within the template pores and may bolster the density and reproducibility of CNT-based devices.

PAA is formed by the anodic oxidation of Al, most commonly in an acidic electrolyte. The Al may be in the form of either a bulk foil or a supported film. During the electrochemical process, a large electric field develops across a thin alumina barrier layer formed at the bottom of vertically progressing pores. The result is an ionic flux of $Al^{3+}$ ions through the alumina layer and into solution and an influx of $O^{2-}$ and $OH^-$ ions into the metallic Al, as seen in FIG. A.1, located in the appendix. Inter-pore spacing and pore diameter exhibit a linear relation with respect to anodization voltage, and natural hexagonal pore arrangements may be obtained at steady state. Pore order may also be obtained by imprinting the top Al surface with dimples, from which pores originate due to the enhanced electric field.

Although what has been described is the use of aluminum metal for the formation of a nanoporous array, various embodiments of the present invention contemplate the use of other materials. For example, Si and Ti also form porous oxides upon anodization. Further, various aluminum alloys can be used for formation of the nanoporous array, including those Al alloys that can be deposited in amorphous form. As one example, the present invention contemplates the use of an Al alloy glass such as 88% AL—7% Yttrium—5% M, where M is Cu, Fe, Co, or Ni. Yet other amorphous Al alloys could include rare earth elements such as samarium.

High-quality single-walled carbon nanotubes (SWNTs) have been synthesized from $H_2$:$CH_4$ mixtures on a MgO-supported bimetallic Mo/Co catalyst using microwave plasma-enhanced chemical vapor deposition (PECVD). Reaction parameters including temperature, $H_2$:$CH_4$ ratio, plasma power, and synthesis time have been examined to assess their influence on SWNT synthesis. Raman spectroscopy and high-resolution field emission scanning electron microscopy reveal that the quality, selectivity, density and predominant diameter of SWNTs depend on the varied synthesis parameters. Results of this study can be used to optimize SWNT synthesis conditions and products and to improve understanding of the growth of SWNTs by PECVD. The term "SWNT" refers to both single-walled carbon nanotubes and double-walled carbon nanotubes.

Single-walled carbon nanotubes (SWNTs) possess an unparalleled combination of mechanical strength and transport characteristics, and great interest exists for their use in a variety of applications including nanoscale electronic devices, compact x-ray cathodes, and composite materials, among others. The ultimate impact of SWNTs in many engineering applications, however, depends on precise control of their physical properties and, as such, the synthesis environment in which they grow. Plasma-enhanced chemical vapor deposition (PECVD) is an attractive method for carbon nanotube (CNT) synthesis because of its independent control of synthesis variables such as substrate temperature, local gas composition, plasma power density, and operating pressure. The dissociation of hydrocarbons in plasma has been suggested as a mechanism to allow synthesis of MWNTs and carbon nanofibers (CNFs) at low temperatures and to control gas chemistry near the growth substrate, [65]. In addition, vertical alignment of CNTs due to plasma sheath effects rather than spatial confinement has been well documented and could aid in development of devices requiring high spatial density of components, such as ultra dense digital memory.

The synthesis of SWNTs using PECVD is a new technique with relatively little known about the influence of synthesis parameters on SWNT growth. CNTs grown by PECVD have traditionally been limited to the production of multi-walled carbon nanotubes (MWNTs). Recently, however, SWNT synthesis has been accomplished using radio-frequency PECVD and shielded microwave PECVD. Among these reports, synthesis conditions vary substantially, and changes in SWNT properties as a result of the parameter changes are not quantified. To date, little emphasis has been placed on optimizing the influential synthesis parameters that affect quality and growth of the SWNTs in a plasma environment.

There are a number of synthesis parameters that affect the growth of SWNTs using microwave PECVD and an MgO supported Mo/Co catalyst. These parameters include the synthesis temperature, inlet feedstock gas composition, growth time, and plasma power. Samples obtained after reaction are characterized using field emission scanning electron microscopy (FESEM), Raman spectroscopy, transmission electron microscopy (TEM), and atomic force microscopy (AFM).

Carbon nanotube synthesis was conducted according to one embodiment of the present invention in a SEKI AX5200S microwave PECVD reactor 102, shown in FIG. 2.1. A 1.5 kW (2.45 GHz) ASTeX AX2100 microwave generator 116 supplied power to the plasma, while inductive substrate heating was supplied by a 3.5 kW radio-frequency power supply acting on a graphite susceptor 108. The reactor walls were electrically grounded and water cooled. The growth substrate 20 rested on a 5.1 cm diameter, 3.3 mm thick molybdenum puck 106 used to concentrate the plasma directly above the sample. A Williamson dual wavelength pyrometer 120 (model 90) monitored the surface temperature of the substrate, while a shielded K-type thermocouple 110 located 2.5 mm below the surface of the heated graphite susceptor allowed for temperature feedback control. A main panel was used to control gas flow rates, chamber pressure, substrate temperature and microwave plasma power.

The catalyst and support were prepared by a wet mechanical mixing and combustion synthesis procedure. This catalyst has been developed for scaled-up growth of SWNTs using a carbon monoxide thermal CVD process. A solution of molybdenum and cobalt nitrate hexahydrate was prepared in atomic ratio of 4:1, and several drops of this solution were added to a solution containing 2-3 g of magnesium nitrate and 0.50 g of citric acid. Distilled water was then added to obtain a translucent pink $Co(NO_3)_2.6H_2O$ solution. Citric acid was used as a foaming agent. The solution was placed in a ceramic boat covered by a flexible aluminum sheet, placed inside a quartz tube and loaded into a furnace held at 550° C. for five minutes. The temperature was controlled using a programmable logic controller integrated with the furnace. The system was then allowed to cool to room ambient. The resulting bimetallic Mo/Co catalyst on nanoporous MgO support was ground to a fine powder using a mortar and pestle, resulting in particles ranging from hundreds of nanometers to tens of microns in size. This catalyst and support system has been shown to play a role in controlling SWNT diameter, as suggested by Liu et al. A mass of 0.030 g of catalyst powder was added to 25 mL of acetone, and the suspension was sonicated for 3 hours. Approximately ten drops of the catalyst suspension were then immediately dispensed onto a silicon wafer using a glass pipette. The suspension was allowed to dry for 30 minutes in air before the substrate was inserted into the PECVD reactor.

Prior to synthesis, the reactor chamber 102 was slowly evacuated to a pressure of 0.5 torr by an external mechanical pump 104. Hydrogen (Praxair 4.5 grade) gas 112 was then introduced into the chamber, maintained at approximately 0.6 torr, at a flow rate of 50 sccm for 5 minutes to purge the chamber. The chamber was then pressurized and maintained at 10 torr with hydrogen gas at a flow rate of 50 sccm. Induction substrate heating was applied until the synthesis temperature was reached. Upon stabilization at the synthesis temperature, a hydrogen plasma was introduced at a power determined by the parametric study. Methane 114 (Praxair ultra high purity) was then introduced into the chamber, initiating the synthesis process. Various synthesis times and inlet gas flow rates were employed for the parametric study. After terminating CNT synthesis, the reactor was evacuated, and the sample was allowed to cool to room temperature before being removed from the chamber. Nitrogen gas (Praxair 4.8 grade) was used to purge and pressurize the chamber.

Synthesis of SWNTs is expected to be favored in a narrow temperature range, and as such temperature was the initial variable studied. Because the heated susceptor temperature is determined directly through feedback control, increments in this temperature were used rather than the substrate surface temperature measured by the pyrometer. Our results indicate that plasma power and susceptor temperature strongly influence the temperature difference between the catalytic surface and heated susceptor, with differences of greater than 100° C. observed in this study. Previous experience with this reactor has shown that the substrate surface temperature may be either substantially higher than the susceptor temperature when using a high-power plasma or lower than the susceptor temperature for a low-power plasma. Other studies on the synthesis of SWNTs by PECVD measured temperature beneath the catalytic substrate by means of a thermocouple, and it is unclear whether the reactive substrate surface was at a higher or lower temperature than that measured by thermocouple.

Raman spectra were recorded and averaged over five locations on each sample. A near-infrared system with cooled CCD (charge coupled device) detection and 632.8 nm wavelength laser excitation were used for recording the Raman spectra. A Hitachi S-4800 FESEM instrument imaged the SWNT product for length, density, and diameter estimates for tube bundles. A JEOL JEM-2000FX TEM and a Veeco Di Dimension 3100 AFM in tapping mode were also used to determine relative density and diameter of the synthesized SWNTs.

Susceptor temperatures of 600, 700, 800, 900 and 950° C., were investigated with corresponding top substrate surface temperatures of 580, 665, 710, 770 and 823° C., as measured by the pyrometer. The synthesis parameters that were held constant during the temperature variation included an operating pressure of 10 torr, 200 W microwave plasma power, and mass flow rates of 50 sccm hydrogen and 5 sccm of methane for 20 minutes. These conditions were chosen based on previous successful SWNT synthesis studies carried out using this catalyst and are to be considered standard conditions unless otherwise stated.

The Raman spectra for the carbon products obtained from samples grown at the foregoing temperatures are shown in FIG. 2.2. The spectra reveal a distinct peak near 1580 cm$^{-1}$ that is associated with highly ordered graphite (called the C-band) and another peak at 1320 cm$^{-1}$ (called the D-band) associated with sp$^2$-bonded nanocrystalline or amorphous carbon species for all temperatures studied. Radial breathing mode (RBM) peaks found at Raman shifts below 400 cm$^{-1}$, indicative of SWNTs, are observed for carbon products synthesized at susceptor temperatures of 800° C. and higher, suggesting that 800° C. is the threshold for SWNT synthesis under the standard conditions using this catalyst. The products from 800° C. growth exhibit a RBM peak at 214 cm$^{-1}$, corresponding to a diameter of 1.1 nm according to the relation $\omega_{RBM}(cm^{-1})=12.5+223.51d(nm)$ for SWNT bundles, where $\omega_{RBM}$ is the frequency of the RBM peak and d is the SWNT diameter. The products from the sample grown at a susceptor temperature of 900° C. exhibit a strong RBM peak at 214 cm$^{-1}$ and less intense shoulders at 190 and 250 cm$^{-1}$, corresponding to SWNT diameters of 1.1, 1.3, and 0.9 nm, respectively. For SWNTs grown at a susceptor temperature of 950° C., the most intense RBM peak shifts to 190 cm$^{-1}$ with less intense peaks at 214 and 250 cm$^{-1}$. The shift in the most intense RBM from 214 cm$^{-1}$ at a susceptor temperature of 800° C. to 190 cm$^{-1}$ at 900° C. suggests that synthesis of larger diameter SWNTs are preferred at higher temperatures.

For nanoscale catalyst particles, a decrease in particle size leads to an exponential increase in carbon solubility. At lower synthesis temperatures, therefore, small catalyst particles are more soluble to carbon than larger particles. It is possible that smaller particles precipitate carbon to form SWNTs with less thermal energy than larger particles. As synthesis temperatures increases, larger diameter parties are expected to become catalytically active. The apparent preferential growth of larger-diameter SWNTs with increasing temperature, however, contradicts theoretical energy studies, which predict that smaller-diameter SWNTs require higher formation energies.

The ratios of the G- to D-band intensity, which indicate the relative amount of amorphous carbon and sidewall and tube end defects compared to highly ordered graphitic carbon, have been used as a purity index to assess the purity of the SWNTs synthesized. A G- to D-band ratio much greater than unity indicates an abundance of highly ordered graphite and graphitic defects and a low amount of undesired carbon species. As shown in FIG. 2.2, samples grown at 900 and 950° C. exhibit the highest G- to D-band ratio (greater than 6.5), while the sample grown at 800° C. exhibits a low G- to D-band ratio of approximately 3. Carbon deposited at susceptor temperatures of 700 and 600° C. do not exhibit RBM peaks and have G- to D-band intensity ratios near unity. In the absence of catalytic activity, self-pyrolysis of hydrocarbon species and radicals produced in the plasma creates relatively large amounts of amorphous carbon deposition and can explain the low quality of these samples.

FESEM micrographs in FIG. 2.3 show that a relatively low density of SWNTs is grown at a susceptor temperature of 800° C., with typical observed lengths of hundreds of nanometers. A much higher density of SWNTs was observed for samples grown at susceptor temperatures of 900 and 950° C., often forming large diameter bundles of 5 nm or greater with lengths up to three microns. Similar types of preferential temperature windows for optimal SWNT growth have been reported for thermal CVD synthesis. At a susceptor temperature of 700° C., sparse populations of small-diameter CNTs were observed by FESEM, while no CNTs were observed for the 600° C. sample. As mentioned previously, no RBM peaks were observed for the sample grown at a susceptor temperature of 700° C. and lower, suggesting that the population of CNTs, if SWNTs, was either too sparse for detection or consisted of small diameter MWNTs.

As evidenced by the results of temperature variation, dense SWNTs of similar diameters and quality were grown at susceptor temperatures of 900 and 950° C. Based on the purity index, the intensity of the RBMs with respect to the G-band, and the density of SWNT growth as determined by FESEM, the optimum synthesis temperature was chosen to be 900° C., and this temperature was fixed in the parametric study of inlet gas composition. Hydrogen to methane volumetric flow rates of 50:2, 50:5, 50:10 and 30:10 (all measured in sccm) were introduced at otherwise standard synthesis conditions. For all samples, Raman spectra of various gas compositions shown in FIG. 2.3 reveal two main active RBMs at 190 and 214 cm$^{-1}$ with a shoulder at 250 cm$^{-1}$ corresponding to SWNT diameters of 1.3, 1.1, and 0.9 nm, respectively. SWNTs grown in the most carbon lean environment (50:2) exhibit two equally intense RBM peaks at 190 and 214 cm$^{-1}$, while SWNTs grown in the most carbon rich environment (30:10) exhibit a strong peak at 214 cm$^{-1}$ with only a faint shoulder at 190 cm$^{-1}$. This shift suggests that smaller diameter SWNTs are selectively favored in the carbon rich environment, with larger diameter SWNTs equally populated in carbon lean environments. A transition to the selectivity of smaller diameter SWNTs with increased methane composition can be observed from intermediate gas compositions. Examination of the normalized G- and D-band intensities in FIG. 2.4 shows that all samples display approximately the same quality. Higher methane concentration in the inlet gas mixture did not increase the relative amount of amorphous carbon formation. Although the use of methane gas is shown and described for synthesis of the carbon nanostructures, the present invention also contemplates the use of other carbon-containing gases.

FESEM micrographs shown in FIG. 2.4 reveal that the density and length of SWNTs increase as the ratio of methane incrementally increases from 50:2 to 50:10. A further increase in the methane inlet composition from 50:10 to 30:10 resulted in no observable increase in density. Relatively sparse SWNTs forming thin bundles with diameters less than 5 nm were observed for the sample grown with a 50:2 gas composition. Gas compositions of 50:5 and 50:10 resulted in large bundles of SWNTs with diameters up to 10 nm, and with lengths of up to several microns at the 50:5 gas composition and up to 12 microns at the 50:10 gas composition. SWNT products of comparable length, bundle diameter, and density exist between samples grown at 30:10 and 50:10 gas compositions. FIG. 2.5 shows a representative TEM micrograph of a SWNT bundle grown with the 50:10 gas composition. The increase in catalytic activity with increasing methane composition from 50:2 to 50:10 suggests that diffusion of carbon through the catalyst in this synthesis regime is a source-dependent phenomenon. SWNT density is similar between samples grown at 50:10 to 30:10 gas compositions, indicating that the carbon supply mode has shifted from source-dependent to rate-dependent. No increase in the amount of amorphous carbon was observed, indicating that atomic hydrogen generated within the plasma may be effective at removing amorphous carbon deposits.

The plasma synthesis environment contains energetic ions that could potentially degrade or destroy SWNTs for extended synthesis times. Previous studies have shown that short synthesis times produce high-quality SWNTs with little amorphous carbon in both thermal CVD and PECVD. Extensive Raman spectroscopy and FESEM studies have revealed that the catalyst used in this study exhibited a lifetime of several hours, without SWNTs transforming to large-diameter MWNTs as reported for a different catalyst in a PECVD process. Synthesis times examined in this study included 1, 5, 20, 60, and 180 minutes under otherwise standard synthesis conditions.

FIG. 2.6 shows the Raman spectra for SWNTs produced under various synthesis times. RBM peaks were again observed at 190 and 214 $cm^{-1}$ with a faint shoulder at 250 $cm^{-1}$ for all samples, corresponding to SWNT diameters of 1.3, 1.1, and 0.9 nm, respectively. At short synthesis times, the dominant RBM peak occurred at 190 $cm^{-1}$, but samples grown for 20 minutes and greater exhibited a dominant RBM peak at 214 $cm^{-1}$, with decreased intensity of the 190 $cm^{-1}$ peak with increased synthesis time. The shift in dominant RBM peaks indicates either that smaller diameter SWNTs remain catalytically active longer than larger diameter SWNTs, or that larger diameter SWNTs are more susceptible to damage by energetic ions and are eliminated.

Examination of the G- to D-band in FIG. 2.6 reveals that samples synthesized for 1 minute resulted in the highest purity index, while those grown for 180 minutes showed the poorest purity index. Synthesis times of 20 and 60 minutes resulted in nearly identical purity indices, half that of the 1 minute synthesis yet roughly 3 times greater than that of the 180 minute synthesis. It is common for catalyst activity to decrease with synthesis time because of gradual catalyst poisoning, leading to reduced quality and increased amorphous carbon deposition. It is also possible that increased exposure to energetic ion collisions produces lattice imperfections within SWNTs, leading to a more intense disordered carbon peak.

Extensive FESEM investigation found that SWNT density generally increased with synthesis time. FIG. 2.6 shows sparse populations of SWNT bundles at a synthesis time of 5 minutes. It is expected that an increase in synthesis time would result in longer SWNTs with increased interactions among the tubes, resulting in larger bundles. While large bundles of SWNTs are clearly visible in FESEM images, individual SWNTs are difficult to resolve. For samples synthesized for 5 minutes, sparse bundles having diameters of less than 5 nm were observed with lengths of hundreds of nanometers to one micron. Larger diameter bundles became more numerous at synthesis times of 20 minutes or greater. SWNTs synthesized for 60 minutes resulted in randomly oriented bundles with some straight bundles reaching lengths of up to 5 microns and having diameters from 3 to 30 nanometers. A synthesis time of 180 minutes resulted in many straight bundles of SWNTs of up to 15 microns in length with diameters of up to 30 nm, although the spatial density of the bundles decreased slightly. It can also be seen in FIG. 2.6 that a synthesis time of 180 minutes created dimples and irregularities on the top surface of the silicon substrate, demonstrating the resilience of SWNTs in a plasma environment. The sample synthesized for 60 minutes was further examined using an AFM in tapping mode. The AFM image in FIG. 2.7 shows both individual SWNTs, 1.3 nm in diameter, and SWNT bundles of diameter 2.5 and 6.3 nm, in general agreement with information gained from Raman spectroscopy and FESEM micrographs.

Plasma power is a variable that can significantly alter the synthesis environment. Plasma power density varies greatly among reactors, and therefore plasma power input is not directly comparable from system to system. Relative changes in volumetric plasma power density, however, are expected to show more comparable results among different reactors. For the setup of FIG. 21, a plasma ball of approximately 2 inches in diameter is generated directly above the catalytic substrate, and little change in plasma volume is observed for the plasma powers considered. Therefore, an increase in input plasma power produced a roughly proportional increase in power density. Plasma power was varied from 130 to 500 W, which represent the lower and upper limits for safe plasma generation at 10 torr for the reactor. The plasma power density plays a direct role in heating the top substrate surface, with plasma powers of 130, 200, 350, and 500 W generating surface temperatures of 760, 770, 800, and 814° C., respectively, for a fixed susceptor temperature of 900° C. In addition to altering the surface temperature, gas composition within the reactor is altered with changes in plasma power density.

Methane is used extensively for SWNT synthesis in thermal CVD because of its stability at high temperatures. A theoretical model of a high power density hydrogen and methane plasma and similar model for the reactor used in this study [86] show that methane is highly decomposed for the plasma powers studied herein, with a two order of magnitude reduction in molar percentage between plasma powers of 130 and 500 W. The concentration of acetylene ($C_2H_2$) remains nearly steady but declines slightly with increasing plasma power and is the second or third most abundant component, depending on plasma power.

Raman spectroscopy reveals RBM peaks located at 190 and 214 $cm^{-1}$ and a shoulder at 250 $cm^{-1}$ for all plasma powers considered in the study. No noticeable changes in dominant RBM peaks are observed among the samples grown at various plasma powers. FIG. 2.8 shows that the relative intensity of the normalized G and D bands for all plasma powers are similar, with the sample synthesized at a 500 W plasma displaying slightly lower quality. FESEM micrographs reveal that the sample grown at 130 W exhibits much lower spatial density of SWNTs compared to those grown at higher energy plasmas. A sample grown without plasma (thermal CVD, not shown here) at otherwise standard conditions resulted in no observable SWNTs or MWNTs by FESEM or Raman spectroscopy. A general increase in density occurs with increasing plasma for the entire range of plasma powers examined in this study, with the most noticeable increase in density occurring between samples grown at 130 and 200 W and between 200 to 350 W, as seen in FIG. 2.8. Bundles of SWNTs grew to a length of 5 microns with bundle diameters from 5 to 30 nanometers for the 500 W case. The sample synthesized at 500 W displayed a higher density of SWNTs and lower surface temperature than the sample synthesized at a susceptor temperature of 950° C. and standard plasma power of 200 W, indicating that the increase in catalytic activity is not a result of increased thermal energy. The increased catalytic activity is attributed to either the increase in a hydrocarbon species other than acetylene or methane, or, alternatively, to higher energy atomic hydrogen ions that more effectively remove amorphous carbon from catalyst surfaces.

A dc electrical bias has been applied to the catalytic growth substrate during microwave plasma-enhanced CVD (PECVD) synthesis of single-walled carbon nanotubes (SWNTs). Both magnitude and polarity of the substrate bias have considerable affects on the SWNT products with respect to yield, purity, and alignment. Application of substrate bias that is negative with respect to chamber walls yields vertically aligned SWNTs with significantly reduced density compared to samples synthesized without external bias. Conversely, a positively biased substrate with respect to the chamber walls dramatically increases both yield and quality of SWNTs with little increase in vertical alignment. It is possible that control over positively-charged hydrogen ions, by means of substrate bias manipulation, is a mechanism responsible for the dramatic change in SWNT products.

Synthesis of single-walled carbon nanotubes (SWNTs) using plasma-enhanced CVD (PECVD) is a relatively new technique and offers a broad parameter space. Very high yields of SWNTs have been realized using chemical additives such as water vapor or oxygen to conventional hydrocarbon PECVD environments. The role of the chemical additives is unclear, but it is hypothesized that oxidation and removal of amorphous carbon on catalyst particles or the selective scavenging of atomic hydrogen are responsible for the increased SWNT production. Vertical synthesis of SWNTs using PECVD has also been achieved; however, the alignment is most often a result of densely packed SWNT films, rather than a controllable mechanism resulting in freestanding individual SWNTs.

The application of dc bias to the growth substrate alters the plasma sheath directly above the substrate, thereby influencing the forces encountered by both charged particles entering the sheath and any SWNTs which may extend into the sheath from the growth substrate. In particular, atomic hydrogen, which is readily produced during hydrocarbon dissociation, has been shown to etch SWNTs. This etching effect preferentially removes small-diameter SWNTs, and may explain the prevalence of SWNTs with diameters greater than 1 nm reported using PECVD techniques.

A SEKI AX5200S microwave PECVD reactor 102 with electrically grounded chamber walls, shown schematically in FIG. 2.1, was used for SWNT synthesis. A hollow stainless steel rod 122 in contact within the center of the graphite heated stage and connected to an external dc voltage supply 124 (Sorensen DCS600-1.7E) was employed for application of dc bias. A K-type thermocouple 110 embedded in the rod 122 monitored the stage temperature, while the growth substrate surface temperature was measured using a Williamson (model 90) dual wavelength pyrometer 120. The silicon growth substrate 20 rested on a 5.08-cm diameter, 3.30-mm thick molybdenum puck 106 used to concentrate the plasma 126 directly above the sample.

The catalyst 28 and support were prepared using a wet mechanical mixing and combustion synthesis procedure using a solution of molybdenum, cobalt nitrate hexahydrate, and magnesium nitrate to produce bimetallic Mo/Co catalyst particles embedded in a nanoporous MgO support. The susceptor 108 was then heated to 900° C. in 50 sccm of flowing hydrogen at a pressure of 10 Torr. After a plasma was ignited at a power of 200 W, a dc bias of controlled polarity and magnitude was applied to the substrate, and 5 sccm methane was introduced for 20 minutes. The surface temperature of the substrate recorded by the dual wavelength pyrometer was approximately 770° C. for all levels of applied bias.

A Hitachi S-4800 field emission scanning electron microscope (FESEM) and Senterra micro-Raman system were used to characterize the resulting SWNTs. Laser excitation wavelengths of 533 and 785 nm were used for recording Raman spectra over ten locations on each sample. The FESEM characterization allowed for length, density, and diameter estimates of individual SWNTs and SWNT bundles, while the Raman spectra quantified SWNT quality and diameter diameters.

The use of a negative dc bias with respect to the walls of chamber 102 was applied to a growth substrate as shown in FIG. 2.1. The application of bias in this manner strengthens the electric field present in the plasma sheath above the growth substrate, thereby further accelerating positively charged ions, such as $H^+$, towards the substrate. Because the relatively heavy positively charged ions have a mobility many times less than that of the free electrons generated in the plasma, the bulk plasma sustains a net positive charge with respect to chamber walls, the surface of highest electrical potential. Because of the highly anisotropic polarization of CNTs, the application of electric fields can orient SWCNTs and multi-walled CNTs (MWNTs) along field lines during CVD synthesis as well as during post-synthesis processing procedures.

To study SWNTs synthesized using negative bias, cross-sectional FESEM analysis was employed to observe vertical alignment which may arise from the enhanced vertical electric field at the growth substrate. The degree of vertical alignment is dependent on the magnitude of the negative bias applied to the substrate. Given an electric field above a critical minimum value, it is anticipated that SWNTs will grow parallel to field lines.

FIG. 3.1 shows both an illustration of the anticipated effect of SWNTs synthesized at different orientations within a sufficiently strong electric field as well as FESEM images of SWNTs synthesized at orientations similar to the illustration. Freestanding SWNTs initiated at an angle with respect to the flat substrate (as shown in FIG. 3.1*b*) display curvature acting to align the tip vertically, reflecting the contours of the electric field lines around the MgO support particle.

FIG. 3.2 shows SWNTs synthesized using applied bias ranging from −100 to −250 V. Without application of bias, SWNTs formed large bundles showing little vertical alignment. These SWNTs tended to follow the profile of the MgO support particles and silicon substrate, likely due to strong van der Waals interactions. In contrast, SWNTs grown using −100 and −150 V show abundant freestanding vertical SWNTs and vertically oriented SWNT loops up to several micrometers in length. SWNTs and SWNT bundles initially growing vertically may experience thermal vibrations of sufficient magnitude that their tip region comes in close proximity to the growth substrate. The subsequent attractive force experienced at the tip region could trap the tip while the base region continues vertical growth, creating vertically oriented loops. SWNTs grown using −200 and −250 V bias (FIG. 3.2(c) and (d)) displayed strongest alignment with mainly freestanding SWNTs, suggesting that the electric field generated at these bias levels was of sufficient magnitude to counteract forces acting to draw the SWNT tips toward the substrate. SWNTs grown at −200 V bias obtained lengths of nearly one micron, while those grown using −250 V bias were significantly shorter.

Although vertical alignment of SWNTs increases with negative substrate bias, the spatial density of SWNTs decreases dramatically, as seen in FIG. 3.2. The negatively biased substrate attracts and accelerates positively charged hydrogen and hydrocarbon ions that are generated in abundance within the plasma, and these species could serve as etchants, destroying SWNTs. Selective etching of small-diameter SWNTs by atomic hydrogen in a hydrocarbon plasma environment has been demonstrated by utilizing oxygen gas as a scavenger to adjust levels of atomic hydrogen. Because vertical SWNTs encounter an electric field along the length of vertical SWNTs when the substrate is biased, these SWNTs are expected to carry electrical current. If the current density exceeds a critical value, a SWNT may be partially or completely destroyed. Typical burnout current for SWNTs based on field emission experiments is anticipated to be on the order of microamps. Based on these criteria, metallic SWNTs and long SWNTs that protrude farther into the plasma sheath would be most susceptible to burnout, as they would carry the largest current. SWNTs carrying a lower current density such as short, larger-diameter, and/or semiconducting SWNTs would thus be more likely to survive the synthesis environment.

Raman spectra obtained at 533 and 785 nm excitation wavelengths, shown in FIG. 3.3(a), confirm the presence of SWNTs. Radial breathing mode (RBM) peaks from 103 to 240 cm$^{-1}$ display a substantial shift in their distribution as a function of negative applied bias, with lower frequency peaks favored with increasing substrate bias. SWNT diameters may be determined using the relation $\omega_{RBM}(cm^{-1})=248/d(nm)$ proposed by Dresselhaus et al., where d is the SWNT diameter and $\omega_{RBM}$ is the Raman shift of the RBM peak. The observed shift in dominant RBM peaks and emergence of new RBM peaks favoring low frequency Raman shifts corresponds to an increase in average SWNT diameter, with SWNT diameters as large as 2.41 nm observed at the −250 V bias synthesis condition. Using a Kataura plot as a guide [105], such as that found in FIG. 3.3(b), the most intense RBMs obtained using the 533 nm excitation wavelength (120-200 cm$^{-1}$) fall within the anticipated range of semiconducting SWNT chiralities for all bias levels. The RBM peaks obtained using the 785 nm excitation wavelength vary from a mix of metallic and semiconducting SWNTs at applied bias levels of −150 V or less (103-211 cm$^{-1}$) to strictly semiconducting at −250 V (103 and 143 cm$^{-1}$). These relations suggest that larger diameter and semiconducting SWNTs are preferred when applying negative substrate bias during PECVD synthesis.

The ratio of the G- to D-bands for a given Raman spectrum indicates the purity of the SWNTs. A G- to D-band ratio much greater than unity indicates an abundance of highly ordered graphite and a low amount of undesired carbon content. The G- to D-band ratio for negatively biased samples, as shown in FIG. 3, decreases from a value of 10 for SWNTs without external bias to approximately 0.45 for SWNTs grown using −250 V. The decrease can be attributed to both decreasing graphitic content caused by lower SWNT density and an increase in SWNT wall defects caused from bombardment of hydrogen ions, as previously discussed. Further, the Lorentzian line shape of the G-bands observed for samples grown using negative bias is indicative of semi-conductive SWNTs, adding further evidence to the selectivity previously discussed.

Application of dc bias that is positive with respect to chamber walls alters the magnitude of the electric field at the growth substrate. Because the plasma potential is slightly more positive than the surface of greatest potential in the PECVD chamber, an electric field much weaker than that obtained when applying negative bias is present at the plasma sheath region near the substrate. A stronger electric field is established at the sheath region near the chamber walls as a result. H$^+$ ions, which are accelerated towards the substrate when the substrate is negatively biased, experience less attraction to the substrate with positive bias.

Substrate bias was varied between 0 and +200 V in 50 V increments while maintaining otherwise standard synthesis conditions. Bias levels of +250 V or greater led to plasma instabilities. Within the bias range between 0 and +100 V, incremental increases in SWNT growth density were observed. FESEM micrographs obtained from samples synthesized within this range of biases, as shown in FIG. 3.4 (a) and (b), reveal SWNT bundles spanning tens of microns in length, with only small variations in density observed between different bias levels. No vertical alignment of SWNTs is observed for these samples using cross-sectional FESEM imaging. Further increasing the bias to +150 V and +200 V led to a dramatic increase in SWNT density. FIGS. 3.4(c) and (d) show typical FESEM micrographs of SWNT products synthesized at +150 and +200 V, respectively. Cross-sectional FESEM images of these samples (FIG. 3.5 (d)) reveal that a small fraction of SWNTs are oriented in the vertical direction. Although a vertical electric field exists at these positive bias levels, its magnitude is much weaker than that generated by a negatively biased substrate, as the potential difference between the substrate and the plasma is substantially less for the positively biased case.

Raman spectroscopy yields further insights into the SWNT products produced using positive bias. While the application of negative bias resulted in a shift in RBM peaks towards lower frequencies, the application of positive bias yields an opposite effect. While RBMs in the range of 100-200 cm$^{-1}$ are present for all levels of positive bias for both 785 and 532 nm excitation wavelength, RBMs greater than 250 cm$^{-1}$ emerge at bias levels at and above +150 V. Employing 785 nm excitation wavelength, a RBM peak at 259 cm$^{-1}$ emerges at +150 V, while a peak at 261 cm$^{-1}$ is present at +200 V. Using 532 nm excitation wavelength, a RBM peak at 251 cm$^{-1}$ emerges at +200 V.

In terms of SWNT diameter distribution, the emergence of these RBMs indicates the emergence of SWNTs with diameters less than 1 nm. As mentioned previously, this effect may be attributed to decreased H$^+$ ion bombardment. Unlike samples grown using negative bias, a mixture of metallic and semiconducting chiralities exist, based on the location of RBM peaks on a Kataura plot, indicating no selectivity of chiralities.

Examination of the G-band also indicates a significant change in SWNT composition between those grown using negative and positive bias. A Breit-Wanger-Fano lineshape, appearing as a shoulder on the G-band at approximately 1550 $cm^{-1}$ in FIG. 3.6, is indicative of metallic SWNTs and is absent in G-bands obtained for SWNTs grown using negative bias. Additionally, the G- to D-band ratios are substantially affected by increases in positive bias. Just as application of negative bias attracts and accelerates $H^+$ ions to the growth substrate, damaging SWNT walls, the application of positive bias mitigates $H^+$ bombardment at the substrate and may partially protect SWNTs from excessive ion bombardment. Consequently, the G- to D-band ratios of SWNTs grown using positive applied bias increase from approximately 10 for samples grown without bias to approximately 40 for syntheses at +200 V. Such a high ratio indicates a large quantity of high-quality SWNTs with little amorphous carbon.

Because the electrically grounded stainless steel PECVD chamber walls become the surface of lowest potential during application of positive substrate bias, positively charged ions are attracted to chamber walls rather than the growth substrate. To ensure that Fe was not sputtered from the chamber walls and was not responsible for additional SWNT growth during application of positive bias, EDS spectra (FIG. 3.7) were obtained from a substrate synthesized using +200 V bias and a substrate synthesized with no external bias using a JEOL-35CF SEM. Comparing the spectra, it can be seen that the presence of Fe is negligible for both samples, indicating that no Fe is added to the substrate during application of positive bias. Trace levels of Fe are present in both samples, as Fe is used as a CNT catalyst for other experiments in the chamber. Other observed elements include Mg, Si, Mo, and Co, as anticipated. The additional SWNT products, therefore, may be attributed to a change in the PECVD synthesis environment rather than Fe contaminants.

Microwave PECVD synthesis of SWNTs was performed with the addition of substrate bias. Both the polarity and magnitude of the applied bias drastically changed the SWNT products. The application of a negative bias with respect to the PECVD chamber walls increases the vertical alignment of SWNTs, decreases their spatial density, and favors the synthesis of larger diameter SWNTs with semiconducting chiralities. Conversely, the application of positive bias leads to little increase in SWNT vertical alignment, a dramatic increase in density, and the emergence of smaller-diameter SWNTS without altering the selectivity of semiconducting and metallic chiralities. The changes in SWNT yield and properties may be explained by the attraction or mitigation of $H^+$ ions at the growth substrate due to a change in the electric field within the plasma sheath region directly above the growth substrate.

Vertical single-walled and double-walled carbon nanotube (SWNT and DWNT) arrays have been grown using a catalyst 28 embedded within the pore walls of a porous anodic alumina (PAA) template 20. The initial film structure consisted of a $SiO_X$ adhesion layer 22, a Ti layer 24, a bottom Al layer 26, a Fe layer 28, and a top Al layer 30 deposited on a Si wafer 21. The Al and Fe layers were subsequently anodized to create a vertically oriented pore structure through the film stack. CNTs 32 were synthesized from the catalyst layer by plasma-enhanced chemical vapor deposition (PECVD). The resulting structure is expected to form the basis for development of vertically oriented CNT-based electronics and sensors.

Single-walled and double-walled carbon nanotubes (SWNTs and DWNTs) 32 have been extensively studied for use in electronic devices because of their desirable electronic transport properties and potential for high-density integration. Densely packed structures may be realized by orienting nanotubes in the vertical direction, perpendicular to the substrate. One possible method for controlled vertical synthesis is the use of a nanoporous template, such as porous anodic alumina (PAA), which acts as a spatial constraint and allows growth to proceed through a narrow vertical channel.

The template is similar to that of PAA, with the addition of a CNT catalyst metal embedded directly into the PAA film structure, as shown in FIG. 4.1. CNT synthesis occurs in a microwave PECVD system that enhances the vertical alignment of SWNTs for other catalytic systems. Because CNT synthesis in the modified PAA structure is initiated in a spatially confined pore, nanotubes emerging from the pores must be vertically aligned within the pore channel. A Ti layer beneath the PAA pore structure is intended to serve as an electrode for subsequent electrodeposition of metallic contacts to address the bottom surface of CNTs for device integration. Because the diameter of the SWNTs and DWNTs growing from the structure are negligible compared to the pore diameter in which they grow, functionalization of the CNTs by addition of a gate dielectric material or biological agent may proceed within the vertical channel, allowing for a functional device to be entirely confined in individual pores.

Ordered nanoporous films were synthesized following a procedure similar to that used to create standard PAA films. Several thin films were deposited on silicon substrates using standard electron beam or thermal evaporation techniques at a base pressure of $5 \times 10^{-7}$ Torr to form the basis for the structure. First, a $SiO_X$ film 22 ranging from 50 to 100 nm was deposited onto the substrate 20 to promote adhesion of subsequent layers to the substrate. Titanium 24 was then deposited to a thickness of 150 nm to act as an electrically conductive layer for future electrodeposition of contact metal after nanotube synthesis. We note that the use of a Pd conductive layer was explored as an alternative to Ti, but the layer itself was catalytically active for carbon nanotubes and sometimes lead to delamination of the film stack above. A 100-200 nm bottom layer 26 of Al was then deposited on the Ti layer, followed by a layer 28 of Fe ranging in thickness from 0.5-20 nm. A top Al layer 30 several hundred nanometers to one micron thick was then deposited to complete the film. A schematic of the film structure and the synthesis procedure is shown in FIG. 4.1.

The top layers of Al and Fe were anodized to the Ti layer using a double anodization procedure to control the final thickness of the top Al layer. Oxalic acid (0.3 M) and sulfuric acid (0.3 M) at 4° C. were used as the working electrolytes, with anodization potentials ranging from 40-80V using oxalic acid and 20V when using sulfuric acid. If larger diameter pores were desired after anodization, the sample was immersed in a 0.1 M $H_3PO_4$ solution to widen the pores (see FIG. 4.3(*d*)). Proper choice of anodization electrolyte and potential allows for optimization of pore size and pitch for a given application. A Pt mesh screen served as the cathode. Anodization of the Al layers proceeded with a nominal current density of 2 $mA/cm^2$; however, a sharp increase in current density of up to 250 $mA/cm^2$ was observed while anodizing through the Fe layer, with vigorous bubble production observed. When the current density decreased to a negligible value upon completion of anodization, as observed in prior reports, anodization was immediately terminated. Anodization of Al films supported on a Ti layer does not fully oxidize the Ti, and electrodeposition of metallic nanowires using the bottom Ti layer as an electrode was possible. A similar technique can be incorporated with this structure to electrically address the CNTs.

After anodization of the catalytic film, ordered pores 34 with diameters of 20-50 nm were observed (see FIG. 4.3), depending on the anodization conditions. Cross-sectional FESEM images reveal a disruption in the vertical order of some pores at the catalyst layer 28, as seen in FIG. 4.3(*a*) and (*c*); however, anodization continued through the catalyst 28 and bottom Al layers, ceasing at the bottom Ti layer. The catalyst metal was thereby locally embedded into the pore wall structure, allowing for exposure to reactive gases during synthesis. It is believed that alumina surrounds the catalyst particles, impeding aggregation of the catalyst and enabling retention of catalytic activity for SWNT and DWNT synthesis. Fe was found to be most compatible for integration into the PAA structure although other embodiments of the present invention also contemplate catalysts such as Ni, Co, and Pd.

CNT synthesis was conducted using a microwave plasma enhanced chemical vapor deposition (PECVD) reactor. During synthesis, the substrate's top surface temperature was measured by a Williamson (model 90) dual wavelength pyrometer aimed at the center of the test substrate, while a K-type thermocouple embedded in the graphite susceptor stage measured stage temperature. Standard synthesis conditions include 300 W microwave plasma power, 10 torr pressure, 50 sccm hydrogen, 10 sccm methane, 900° C. stage temperature for 10 minutes. The substrate surface temperature ranged from 770 to 800° C. during syntheses. After synthesis, the chamber was immediately evacuated to remove reactive species, and the sample was allowed to cool to room temperature before being removed from the chamber.

A Hitachi S-4800 cold field emission scanning electron microscope (FESEM) was utilized for SEM imaging. High-resolution transmission electron microscopy (HRTEM) was carried performed on a FEI Titan 80/300 field emission electron microscope with a point-to-point resolution of 2°A at 300 kV. Samples for TEM were prepared by CNTs dispersion from the template using a sonication in ethanol for 30 minutes followed by centrifugation for 10 minutes. Afterwards a drop of the dispersed solution was placed on a lacey carbon TEM copper grid to allow imaging of individual CNTs.

Small-diameter CNTs can be observed within the pore structure after PECVD synthesis using FESEM imaging, as shown in FIG. 4.3. Lengths of the CNTs exceed several microns, and bundles consisting of many CNTs are observed merging on the PAA surface. The localized high-contrast signatures produced when CNTs contacted the top alumina surface due to electron beam charging effects was advantageous for locating the CNTs by FESEM but made diameter estimations difficult. Quantification of CNT population density from PAA pores using FESEM imaging is inherently difficult but is further complicated by the many orientations of CNTs with respect to the focal plane (FIG. 4.3 (*a*)-(*c*). Additionally, the formation of bundles consisting of many CNTs further complicates locating the pore of origin of individual SWNTs. Approximately 10% of pores generate CNTs for the film configurations producing the highest density, and only one CNT is observed emerging for each catalytically active pore.

As mentioned previously, Fe was chosen as the catalyst layer for the anodized film structure because of its ability to catalyst CNTs and its stability during anodization. Images obtained from films containing Co, Pd, and Ni as a catalyst layer may be found in FIG. 4.2 (*a*)-(*c*). Additionally, Pd was substituted for Ti as a conductive layer underneath the anodized film structure for subsequent post-processing, as Pd establishes ohmic electrical contact to SWNTs. Anodization current increased when the anodization front reached the Pd layer, sometimes leading to instability of the film and delamination. Because Pd is a CNT catalyst, large-diameter MWNTs were synthesized during the PECVD synthesis. These CNT films were often tens of microns in height, and the growth of the CNTs caused delamination of the anodized film above.

Many of the CNTs emerging from the top PAA surface are vertically oriented, as seen in FIG. 2*a*, but alignment uniformity would likely benefit from application of a negative substrate bias during PECVD synthesis. Despite obtaining a length exceeding several microns, CNTs and small CNT bundles maintain a vertical orientation or form vertically oriented loops. Additional horizontally oriented CNTs are observed on the top PAA surface (FIG. 4.3 (*b*) and (*c*)). We note that the cross-sectional FESEM images were obtained by cleaving the PAA, thereby releasing the CNTs from their pores of origin. As such, identifying the origin of CNTs within the pores using cross-sectional images is difficult, though one such image is shown in FIG. 4.3 (*d*). Numerous CNTs may be observed emerging from their pores of origin, however, by examining the top PAA surface, as seen FIG. 4.3 (*b*).

CNT density was not a strong function of starting catalyst film thickness for iron layers between 1 and 10 nm for the synthesis conditions previously mentioned. Density was affected by altering the distance from the PAA top surface to the catalyst layer. A catalyst layer embedded further from the top PAA surface resulted in lower density. Delamination of the film at the Al/Fe/Al interface can occur when anodizing films with Fe layers greater than 10 nm.

HRTEM images, such as those in 4.4 (*a*),(*b*), reveal a mixture of SWNTs and DWNTs produced from the modified PAA structure. The observed average diameter of both SWNTs and DWNTs based on HRTEM was approximately 2 nm. Micro-Raman spectroscopy using a 785 nm excitation wavelength and 50× magnification was also used to characterize the CNT yield. Peaks at 132, 202, and 302 cm$^{-1}$ correspond to radial breathing modes (RBMs), while peaks near 1300 and 1580 cm$^{-1}$ indicate disordered and graphitic carbon (D- and G-bands), respectively. The diameter of SWNTs may be determined using the relation $\omega_{RBM}(\text{cm}^{-1})=248/d(\text{nm})$ proposed by Dresselhaus et al., where d is the SWNT diameter and $\omega_{RBM}$ is the Raman shift of the RBM peak. The relation may also be used to approximate the diameter of inner and outer shells of DWNTs. The RBM peaks observed thus correspond to SWNT diameters and/or shells of DWNTs of 1.9, 1.2, and 0.8 nm, respectively, in agreement with HRTEM analysis. In addition, the intensity ratio of the G-band to D-band, a metric for SWNT quality, is approximately 4, indicating relatively high-quality CNTs. The broadening and intensity of the D-band may originate from contributions of amorphous carbon deposited on the pore walls.

A PAA template with a localized catalyst layer embedded into the pore walls has been used for the first time to synthesize CNTs. HRTEM and Raman spectroscopy reveal that a mixture of SWNT and DWNTs are synthesized, while FESEM reveals CNTs initiating from the catalyst layer and emerging from their pores of origin. The structure contains a conductive Ti layer underneath the PAA template to serve as the anode for future electrodepostion of nanowires to electrically address the bottom surface of the CNTs.

Synthesis of vertical and quasi-vertical single-walled and double-walled carbon nanotubes (SWNTs and DWNTs) from catalytically active porous anodic (Al—Fe—Al) multilayer templates, similar to porous anodic alumina (PAA), has been demonstrated. We report an experimental parameter study of porous anodized Al—Fe—Al multilayered film structures with respect to pore aspect ratio, Fe layer thickness, and pre-anodization annealing. Performance of the film structures is measured by CNT catalytic activity and the vertical pore order on both sides of the Al—Fe—Al interface. Results from the study suggest an activation energy of 0.5 eV for CNT growth from the template and that void production in the template can be mitigated by thermal diffusion.

Anodized thin Al foils and supported Al films to form porous anodic alumina (PAA) have been used for the templated synthesis of metallic nanowires and for the synthesis of large-diameter multi-walled CNTs (MWNTs). In addition, the anodization of co-sputtered films of Al and Fe (with uniformly distributed Fe) has been studied with Fe concentrations of 4 at % and 7.5 at. % using 0.01 M ammonium pentaborate as an anodization electrolyte. When anodized above threshold potentials, the nonporous anodized films developed voids due to the encapsulation of oxygen gas produced during the incorporation of Fe into the anodized film. The threshold voltages for void formation were dependent on Fe concentration in the alloy and decreased from a value of 300 V at 4 at. % Anodization of the alloy below the threshold value resulted in a uniform anodic film having a Fe concentration similar to that of the beginning metal alloy. Although the precise mechanism for oxygen formation within the anodizing Al—Fe alloy is uncertain, the oxidation of $0^{2-}$ ions at the moving anodized film/metal interface for other binary Al alloys (Al—Cr, Al—Au) during anodization produces similar high-pressure oxygen-filled bubbles and cavities. Similarly, the anodization of FVS0812 Al alloy, containing 4.3 at. % Fe among other alloying elements, in 1 M sulphuric acid resulted in a porous film comprised of multibranched pores with many voids due to oxygen generation.

Single-walled CNTs (SWNTs) and double-walled CNTs (DWNTs) have been incorporated into a myriad of devices such as electronics sensors, and electron emitters because of their excellent transport and mechanical properties. The development of high-density CNT-based devices can be aided by the establishment of a structure that can accommodate in situ formation of electrical contacts. For optimal CNT device integration, an uninterrupted vertical pore order (without branching) of the anodized structure and large population of pores containing CNTs are advantageous to the development of structures containing one functional device per vertical pore.

Synthesis of the catalytic film structures analyzed in this study began by successive depositions of SiO2, Ti, Al, Fe, and Al onto a thermally oxidized Si wafer using electron beam evaporation at a base pressure of $5\times10^{-7}$ torr or less. For all samples, consistent thicknesses of 50 nm $SiO_2$ and 150 nm Ti were deposited. The $SiO_2$ layer acted as an adhesion layer, while the Ti layer may be used as an electrode for further processing, such as electrodeposition of metallic nanowires. The bottom Al layer thickness ranged from 100-200 nm, while the top Al layer varied from 300 to 700 nm. The bottom Al layer was chosen based on optimum conditions for Pd deposition on CNTs from other experiments. Fe layer thicknesses ranged from 0.5 to 20 nm. Deposition rates of all metals other than Fe were maintained at 1 nm/s or less, while the deposition of Fe was maintained at approximately 0.1 nm/s or less to ensure a planar Al—Fe—Al interface. Although specific thicknesses of the various layers have been described, these are by example only, and are not constraints to the various embodiments of the present invention.

Anodization of the Al and Fe layers proceeded using standard two-step anodization procedures. The anodization electrolytes examined include 0.3 M oxalic acid and 0.3 M sulfuric acid maintained at 5° C. Anodization voltages include 40 V for oxalic acid, and 20 V for sulfuric acid. Pore diameter and pitch may be controlled based on the anodization electrolyte and voltage. The height of the top anodized alumina layer can be partially controlled by the duration of the first anodization step and subsequent removal using the two-step procedure. The anodization current for Al layers was approximately 5 mA/cm$^2$, while the current reached as high as 1 A/cm$^2$ during anodization of the embedded Fe layer, depending on the Fe layer thickness and pre-anodization annealing conditions discussed in subsequent sections. The current produced by anodization of the Fe layer for samples that had undergone annealing prior to anodization was always significantly reduced and was similar to that of pure aluminum anodization for films with Fe layers of 10 nm or less.

CNTs were synthesized in a microwave plasma-enhanced chemical vapor deposition (PECVD) system. Synthesis conditions were chosen based on optimized conditions used for SWNT growth using a MgO supported Mo/Co catalyst structure and previous experience with this catalyst structure. Standard synthesis conditions included 10 torr, 10 sccm $CH_4$, 50 sccm $H_2$, 900° C. susceptor temperature (800° C. surface temperature as monitored by dual-wavelength pyrometer), and 300 W plasma power for ten minutes.

The aspect ratio, defined as the distance from the Fe layer to the top PAA surface divided by average pore diameter was examined to determine its effect on CNT catalysis. Although the transport mechanism of hydrocarbons to the catalyst layer is unknown, the pore diameter and depth of the Fe layer are expected to play a role in the availability of reactive hydrocarbons for catalysis of CNTs. Three film structures were incorporated for this study. All films had common layers of 50 nm $SiO_x$, 150 nm Ti, 200 nm Al, and 1 nm Fe. Samples anodized with sulfuric acid and 20 V potential incorporated a 350 nm top alumina layer and produced an average pore diameter of approximately 15 nm, while those obtained using oxalic acid and 40 V potential had either a top alumina layer thickness of 350 or 700 nm and produced an average pore diameter of approximately 30 nm. The thickness of the bottom alumina layer was found to have little significance with respect to CNT catalysis and was chosen based on optimum conditions for CNT functionalization. Aspect ratios of the anodized films ranged from approximately 12 for samples anodized with oxalic acid and a 350 nm top alumina layer to approximately 24 for samples anodized with sulfuric acid and for samples anodized with oxalic acid and a 700 nm top alumina layer.

To analyze the effect of aspect ratio, growth of CNTs from pores of various aspect ratios as a function of synthesis temperature were assessed. PECVD synthesis conditions were as previously stated with the exception of substrate temperature and synthesis time, which varied from 650 to 950° C. for 3 minutes. CNT density generally increased as aspect ratio decreased, as observed with large-diameter CNT synthesis from PAA templates. Samples anodized using sulfuric acid produced very sparse CNT populations at synthesis temperatures of 800° C. or less, with moderate CNT density observed between 850 and 950° C. Conversely, the excessive density and bundling of CNTs synthesized from films anodized with oxalic acid and a synthesis temperature of 900° C. or greater made accurate length measurements of individual CNTs difficult. As a result, samples anodized using sulfuric acid were analyzed in a temperature range from 850-950° C., while those anodized using oxalic acid were analyzed within the range of 650-850° C., in 50° C. increments. We also note that electron charging effects between the CNTs and the top alumina surface facilitates FESEM observations of CNTs on the top film surface, as the charging greatly exaggerates the apparent CNT diameters.

FIG. 5.1(a)-(d) displays representative FESEM micrographs for samples anodized using oxalic acid with top alumina layers of 700 nm and 350 nm and sulfuric acid with a top alumina layer of 350 nm at 850° C. for 3 minutes. As stated above, the highest CNT density was observed on the sample with a 350 nm top layer anodized with oxalic acid, as seen in FIG. 5.1(a). Only slightly lower density was observed on the sample with a 700 nm top layer and similar anodization conditions (FIG. 5.1(b)), while substantially less density was observed with the sample anodized in sulfuric acid (FIG. 5.1(c)). Although the spatial density of pores for films anodized using sulfuric acid is greater than those anodized using oxalic acid, the dramatic decrease in CNT density for films anodized with sulfuric acid compared to a film of similar aspect ratio anodized in oxalic acid suggests that absolute pore diameter may have a more direct effect on CNT density than the aspect ratio previously defined, as the cross-sectional area of the pores may govern the access of hydrocarbon molecules to the catalyst layer.

To quantify the CNT growth from the various film structures, average growth rates of CNTs as a function of synthesis temperature were obtained. After CNT growth, samples were examined by angled cross-sectional FESEM analysis to obtain length distributions on the top PAA surface. The distance of the top alumina layer was then added to the CNT length obtained on the top surface to compute a total length. Although the average growth rate of the CNTs was observed to decrease with total synthesis time, as also observed by others, the evolution of average growth rates between various growth temperatures with time follows similar trends. The difference between the average growth rates measured at 700 and 800° C., as shown in FIG. 5.2(a), is approximately constant at syntheses times of 3 minutes and greater, ensuring that comparisons of growth rates at 3 minute syntheses times as reasonable. A synthesis time of 3 minutes was therefore chosen for all samples, as this time yielded CNTs with lengths that could be easily measured using FESEM imaging. An average of more than 75 CNTs was examined for each sample at a given temperature. A representative histogram of CNT lengths measured for a film anodized in oxalic acid with a 350 nm top alumina layer is shown in FIG. 5.1(d).

The average growth rate of CNTs from these film configurations as a function of synthesis temperature is shown in the Arrhenius plot in FIG. 5.2(b). Error bars indicate the standard deviation from the mean of sampled values. Although CNT density may vary dramatically between film structures, FIG. 5.2(b) shows that the average growth rate for a given temperature is nearly identical for the various structures. Based on this observation, the growth rate of CNTs is approximately the same within the pore channel as it is on the top PAA surface, and may indicate that the base growth mechanism is the dominant growth mode from the catalytic layer.

Applying an exponential line fit to the combined data obtained from the film structures (shown in FIG. 5.2(b), the growth rate may be related to the diffusion rate of carbon into catalyst particles. The relationship is given by the Arrhenius law, given as $k = \frac{E_{act}}{RT}$ where k is the rate of carbon diffusion, A is the pre-exponential factor, $E_{act}$ is the activation energy, R is the universal gas constant, and T is absolute synthesis temperature. Based on the Arrhenius law and the data in FIG. 5.2(b), an activation energy of 53 kJ/mol, or 0.52 eV, its observed for CNTs grown from the templated structures. Typical reported activation energies observed for PECVD synthesis of MWNTs using $C_2H_2$ as a carbon source are 0.30 eV using a Fe catalyst and range from 0.23 to 0.76 eV when using a Ni catalyst with CH4 as a carbon source during PECVD for synthesis of MWNTs. For comparison, an activation energy of 1.21 eV has been reported for similar syntheses conditions using thermal CVD with a Ni catalyst.

The significant difference in reported activation energy between thermal and plasma-enhanced CVD may be explained by examining the energies required for the various processes in CNT synthesis. The difference may be the result of the dissociation required for the dissociation of the precursor molecule, the adsorption of the precursor molecule to the catalyst surface, the diffusion of the growth species on or into the catalyst particle, and the incorporation of carbon into the precipitated CNT. There may be an energy barrier for dissociation of $C_2H_2$ on the Ni(111) plane to be 1.3 eV, compared to 5.58 eV for a similar reaction in vacuum (underscoring the catalytic effect of the particle) and 0.9 eV for $CH_4$. In PECVD synthesis, however, dissociation of carbon precursors occurs in the plasma, thereby requiring less energy to be supplied in the form of catalyst heating. Finally, the energy required for carbon surface diffusion on a Ni(111) surface was calculated to be 0.4 eV while the activation energy required for diffusion of carbon through bulk FCC Ni was found to be 1.6 eV. It was determined, therefore, that surface carbon diffusion is responsible for the low activation energies exhibited for PECVD synthesis, while surface dissociation of carbon precursors at the catalyst surface leads to the relatively high activation required for thermal CVD synthesis.

The thickness of the initial Fe layer influences the amount of catalytically active material available in the cell walls for CNT synthesis. However, during anodization of the Fe-rich interfacial region, material around the circumference of a pore is compressed by excessive oxygen formation, causing inter-pore void formations and necking of the interfacial region, as seen in FIG. 5.3 (a). The anodization of an abrupt Fe-rich layer leads to a sudden increase in anodization current and a loss of anodization equilibrium, resulting in a re-initiation of pore spacing as anodization continues in the bottom Al layer. Consequently, vertical pore order is often interrupted at the Al—Fe—Al interfacial region, resulting in a high percentage of branching pores rather than purely vertical pores from the top PAA surface to the Ti layer.

During CNT synthesis, it may be assumed that much of the catalytically active alumina is located in the necked region between pores and out of the direct line of sight of incoming hydrocarbons. Therefore, catalyst activity may be hindered by oxygen void formation. Although an increase in Fe layer thickness increases total Fe content, an increased Fe concentration correlates to increased oxygen formation and increased void formation, leading to inter-pore necking. In addition, anodization of samples with an initial Fe layer thickness of 5 nm or greater often led to sufficient oxygen production to damage a template, causing delamination of the film at the Al—Fe—Al interface during anodization. Very little correlation between Fe layer thickness and CNT density is observed for Fe layers between 1 and 20 nm, although decreased density is observed using a 0.5 nm layer, as demonstrated more clearly in subsequent sections.

An alternative approach to enhance the catalytically active Fe within pore walls beyond that of a single Fe layer is the introduction of multiple thin Fe layers separated by an Al layer. In such a way, multiple catalytic sites may be located along the vertical length of a pore instead of one. Cross-sectional FESEM images of double and triple Fe layer films separated by a 100 nm Al layer clearly show sets of interfaces denoted by the levels of void formation and interpore necking, shown in FIG. 5.3. An increase in CNT density was observed using multiple Fe layer films as compared to a single layer with the same total Fe thickness, but these structures introduced an additional void layer, leading to a further loss of vertical pore order.

Although some $Fe^{2+}$ ions are inevitably lost to solution at the interfacial region during the anodic pore formation in a similar manner to $Al^{3+}$ ejection (see Appendix), very little, if any, is expected to deposit on the top PAA surface and catalyze CNTs. This hypothesis is confirmed by FESEM observations of CNTs emerging from pores and cross-sectional images of CNTs originating at the localized catalyst layer, as shown in FIG. 5.3 (d). Annealing of the Fe layer within the film, discussed in greater detail in subsequent sections, may significantly decrease inter-pore void formation and increase CNT catalytic activity. Because less Fe is anticipated to be lost to solution with the reduction of void formation, the additional CNT density observed with films that undergo thermal diffusion may be attributed to Fe being directly accessible on the pore walls rather than Fe ions being deposited on the top PAA surface during anodization.

The anodization of Fe-rich alumina produces excess oxygen gas, the pressure from which damages the interfacial region, generates inter-pore voids, and leads to a loss of vertical pore order. To diffuse Fe into the surrounding Al films and to reduce the Fe concentration at the interface, annealing of the film stack was performed prior to anodization to activate Fe diffusion. Process temperatures from 300-550° C. in a dry air ambient were studied with various Al—Fe—Al film configurations. An annealing temperature above 550° C. severely affected the planarity of the anodized film surface, while temperatures of 400° C. or less were insufficient to affect the morphology of the anodized structure for durations less than 3 hours. The temperature range between 450-500° C. produced planar films and noticeable changes in the anodized structures for annealing times of one hour or less.

The deposited Fe layer thickness plays a role in the effectiveness of the annealing process in terms of vertical pore order of the anodized film and the resulting CNT density. A thicker initial Fe layer produces a larger total Fe dose and a higher Fe concentration throughout the effective diffusion length for a given diffusion temperature and time. Due to the thin Fe layer relative to the Al layers on either side, intermetallic $FeAl_3$ islands are likely to form at the annealing temperature studied herein. With increasing annealing time, a relatively uniform $FeAl_3$ film will give way to form islands that would coarsen due to Oswald ripening. Concurrently, interdiffusion of Al and Fe would produce areas of Al containing negligible Fe between $FeAl_3$ islands, as the solubility of Fe in FCC Al is negligible. Sufficient coarsening of the $FeAl_3$ to disrupt the initial continuous layer and allow anodization is expected to result in a minimization of voids from oxygen production while increasing the vertical pore order. In such a way, anodization may proceed between $FeAl_3$ islands with minimal interference. In addition, with minimal coarsening, $FeAl_3$ islands are sufficiently small as to be easily incorporated into the alumina pore walls without excessive oxygen production, leading to an increased catalytically active area from which CNTs may originate.

FIG. 5.4 shows the effect of 450 and 500° C. diffusion for 20 and 60 minutes using a 2 nm initial Fe layer and 100 nm bottom Al layer. Based on cross-sectional FESEM images of the anodized structure, diffusion at 450° C. for an hour or less is insufficient to adequately reduce the concentration of Fe at the interface to prevent inter-pore necking and void formation. As mentioned previously, a nearly continuous $FeAl_3$ layer may be present at this layer. Comparing FIG. 5.4(a) (20 min.) to FIG. 5.4(b) (60 min.), very little change is observed with respect to inter-pore void formation at the Fe layer and vertical pore order for a diffusion temperature of 450° C. A different phenomenon may be observed for a 500° C. diffusion temperature. For the range of diffusion times examined, areas of alumina with irregular pore structure may be observed near the initial Al—Fe—Al interface. The irregular material may span hundreds of nanometers from the interface, with an increase in coverage with diffusion time. Further, the inter-pore void formation at the interface is reduced compared to the 450° C. diffusions at similar times, with void production drastically reduced for 60 minutes. Due to the increased temperature and time, the 500° C. diffusion could produce coarsened $FeAl_3$ islands that are non-uniform in size and dispersion, which could explain the non-uniform distribution of irregular alumina areas. Alumina with irregular pores is believed to be produced in regions where Fe concentration is sufficient to produce oxygen gas, but at a slow enough rate that the gas may escape through the pores to the film surface, thus alleviating sufficient pressure so that large voids do not form. Similar pore structures were obtained during the anodization of FVS0812 Al alloy containing 4.3 at % Fe, in 1 M sulphuric acid. Some irregular areas were able to maintain a general vertical pore structure but produced pore walls that were not smooth, as seen in FIG. 5.4(d). Similar areas are rarely found for films employing 450° C. diffusion, as the highest Fe concentration is confined to the vicinity of the interface. Because the Fe concentration is substantially higher in a more localized area about the interface under 450° C. diffusion, oxygen gas may be produced too rapidly to escape through the pores.

FIG. 5.5 shows the effect of similar diffusion temperatures and times on a film structure with a nominal 0.5 nm initial Fe layer. Because the total dose of Fe is less than the 2 nm film discussed previously, different phenomena are observed. FIGS. 5.5 (a) and (b) show that 450° C. diffusion at 20 and 60 minutes is sufficient to reduce inter-pore void formation, with nearly only very small voids observed after a 60-minute diffusion. All pores observed for both diffusion times displayed no loss of vertical pore order at the interface. Similarly, void formation is nearly eliminated using a 500° C. diffusion step. We note, however, that irregular alumina and some loss of vertical pore order was observed below the interfacial layer for most 500° C. diffusions. It is possible that $TiO_x$ or Ti at the pore bottoms may inhibit the diffusion of Fe in the bottom Al layer, or that Ti may sufficiently diffuse into and react with the bottom Al at 500° C. to form Ti—Al intermetallic phases.

A reduction in the inter-pore void formation results in pores with smooth walls at the interfacial region. In comparison to pores with severe inter-pore necking at areas of high Fe concentration, smooth walls incorporate more Fe directly into the line of sight of hydrocarbons entering from the top of the pore. CNT density resulting from films undergoing thermal diffusion is increased as a result. FIG. 5.6 compares the CNT densities of similar Fe layer thicknesses with and without preanodization annealing. In general, a thicker initial Fe layer increases CNT density after pre-anodization annealing, although vertical pore order may be compromised with thicker Fe films.

Films containing multiple Fe layers also benefit from pre-anodization annealing. CNT density is dramatically increased by the addition of multiple Fe layers, as shown in FIG. 5.7. In fact, comparing FIG. 5.7 (c) with FIG. 5.6 (f), it is apparent that three Fe layers, each of 0.5 nm thickness, separated by 100 nm Al, produce a higher CNT density than a single 2 nm thick Fe layer. The increased density can be attributed to a greater surface area of alumina of sufficient Fe concentration to be catalytically within the pores, even when compared to a single layer of comparable total Fe. The pore order of samples containing multiple Fe layers that are subjected to pre-anodization annealing also exhibit improved vertical pore order, although irregular alumina areas may appear between Fe layers due to the resulting high Fe concentration.

A parameter study investigating the effects of pore aspect ratio, Fe layer thickness, multiple Fe layers, and thermal diffusion on anodized Al—Fe—Al structures with respect to vertical pore order and CNT production has been conducted. The study reveals that for film structures not undergoing annealing prior to anodization, pores with large aspect ratios yield CNTs of lower density but of equivalent length to those of lower aspect ratios. An activation energy of 0.52 eV was estimated from CNT growth rates using various template film configurations and suggests that surface diffusion of carbon on the catalyst particles may be the dominant mechanism for CNT growth. CNT density is relatively unaffected by the initial Fe layer thickness in such structures, although inter-pore void formation is increased with thicker Fe films due to oxygen gas formation and encapsulation. Multiple Fe layers separated by 100 nm of Al yielded greater CNT density than films containing a single Fe layer, although vertical pore order was diminished.

Annealing of the film structure prior to anodization, however, produced changes in the vertical pore order and CNT density. Proper choice of annealing conditions for pre-anodized films is capable of assisting in the formation of vertical pores with smooth walls in the anodized structure. Large areas of $FeAl_3$, caused by the coarsening of islands due to Oswald ripening at elevated temperatures and extended annealing times, however, often produced amorphous alumina, although inter-pore void formation at the Al—Fe—Al interface was dramatically decreased. CNT density increased with Fe layer thicknesses by employing pre-anodization annealing. The use of multiple Fe layers separated by Al and pre-anodization annealing resulted in films with very high CNT density and vertical pores, but amorphous alumina often formed between Fe layers. The results of this study are expected to extend the functionality of anodized Al—Fe—Al structures for use in CNT-based devices.

A method for creating a vertical single-walled carbon nanotube (SWCNT) electronic device is realized using a SWCNT catalyst embedded into the walls of a porous anodic alumina (PAA) template 20. The synthesis of the structure 20 begins with the deposition of thin films onto a crystalline substrate 21. The deposited films include an adhesion layer 22 between the bulk structure and the substrate, an electrically conductive layer 224, aluminum 26, a carbon nanotube catalyst metal 28, and an additional aluminum layer 30. The top aluminum layer, the CNT catalyst layer, and the bottom aluminum layer are then anodized to the conductive metal layer using standard procedures. The resulting structure contains ordered nanoscale pores whose walls are comprised of alumina except a local layer of embedded CNT catalyst.

A plasma enhanced chemical vapor deposition (PECVD) synthesis technique is subsequently incorporated to initiate SWCNT growth from the catalyst layer within the pores. Electrical contact to the SWCNT is obtained by electrodeposition of metallic particles to the conductive layer at the pore bottom deposited to a final depth that contacts the base of the SWCNT. Controlled deposition of a dielectric material around the vertical pore-confined SWCNT creates an electrostatic gate that may be used to modulate electrical current in the SWCNT channel. Electrical isolation between the drain contact and subsequent gate contact is then deposited to the pore bottom. A thin metal gate contact is then deposited onto the dielectric-coated SWCNT. Electrically insulating material is then deposited into the pores, coating the CNT structure and closing the pore. Chemical etching of the excess insulating material exposes the top SWCNT surface and gate contact. Finally, a top electrical contact to the SWCNT channel and gate contact is realized by depositing a suitable metal using electron beam evaporation. This device structure affords an ultra-high density of efficient electronic devices.

Electrical contact to the SWCNT can be obtained by electrode position of metal within the pores, initiating at the exposed conducting layer at the pore bottom and proceeding until the electrodeposited metal makes contact with the base of the SWCNTs (the "drain" or "source" contact). Conformal deposition of a dielectric material around the vertical pore-confined SWCNT creates the gate dielectric that will allow electrostatic modulation of the conductance of the SWCNT channel while minimizing leakage into the gate electrode. A thin metal gate contact is then deposited conformally onto the dielectric-coated SWCNT. Electrically insulating material is then deposited into the pores, coating the CNT structure and closing the pore. Chemical etching of the excess insulating material exposes the top SWCNT surface and gate contact. Finally, a top electrical contact ("source" or "drain") to the SWCNT channel and to the gate contact are realized by depositing suitable metals using electron beam evaporation.

Ordered nanoporous films were synthesized following a procedure similar to that used to create standard PAA films. Several thin films were deposited on silicon or sapphire wafer substrates using standard electron beam or thermal evaporation techniques to form the basis for the nanoporous structure. First, a $SiO_x$ film with thickness in the range of 15 to 100 nm was deposited onto the substrate to promote adhesion of subsequent layers. A sufficient work of adhesion is also obtained if beginning with an oxidized silicon substrate. An electrically conductive layer such as Ti or Pt was then deposited to a thickness of 50-250 nm to act as an electrode for subsequent electrodeposition of metal nanorod contacts after SWCNT synthesis. A bottom layer of Al was then deposited onto the conductive layer to a thickness of 50 nm or greater. A catalytically active metal for carbon nanotube synthesis was then deposited to a thickness of 2 to 50 nm. Metals used for this layer included Fe, Ni, Co, or Pd. A top Al layer was then deposited to a thickness of several hundred nanometers to one micron.

The top layers of the film structure (Al/catalyst/Al) were then anodized to the electrically conductive layer using standard procedures for PAA anodization. Oxalic acid (0.3 M) at 4° C. was used as the electrolyte, and anodization potentials between 20 and 50 V were used. A Pt mesh screen served as the cathode. A double anodization procedure is also contemplated to introduce better pore order than that produced using a single anodization step. Between anodization steps the structure was submersed in a solution of H2S04 and Cr03 to dissolve the alumina produced from the initial anodization step. If a larger pore structure was desired after anodization, the sample was immersed into a 0.1 M $H_3PO_4$ solution to widen the pores and ensure that the pore bottom was exposed to the conductive underlayer. Nail polish was used to coat the edges of the sample, preventing anodization of the exposed conducting underlayer. Pore diameters ranged from 10-50 nm, depending on the anodization conditions. The resulting structure formed a circular channel from the top surface of the film to the electrically conductive layer, similar to conventional PAA. Unlike conventional PAA, the walls of the nanoscale channel contained a localized area of SWCNT catalyst 28.

SWCNT synthesis was conducted using a microwave plasma-enhanced chemical vapor deposition (PECVD) reactor. The silicon substrate and anodized catalytic film was placed on a 2-inch diameter molybdenum puck and inserted into the reactor chamber. The puck served to concentrate the plasma directly above the sample. The chamber was slowly evacuated to a pressure of 0.5 torr by a mechanical pump. Hydrogen (Praxair 4.7 grade) gas was then introduced into the chamber, maintained at roughly 0.6 torr, for 5 minutes at a flow rate of 50 sccm to purge the chamber. The chamber was then pressurized with hydrogen gas to 10 torr at a flow rate of 50 seem. Induction substrate heating was applied by a 3.5 kW RF source acting on a graphite susceptor upon which the molybdenum puck rested. A K-type thermocouple embedded in the center of the susceptor and located at a depth of 2.54 mm from the top of the susceptor surface allowed for feedback control. The substrate's top surface temperature was measured by a dual wavelength pyrometer (Williamson model 90) aimed at the center of the test substrate.

After the susceptor temperature stabilized at the synthesis temperature, a hydrogen plasma was initiated at a power of 200-500 W. The synthesis temperatures ranged from. 800-900° C. (susceptor), corresponding to a surface temperature of 710-900° C., depending on the plasma power. Methane (Praxair ultra high purity) was introduced into the chamber at a flow rate of 5-10 sccm, beginning the CNT synthesis process. An applied DC bias to the growth substrate may be incorporated to enhance vertical alignment of tubes which have emerged from the pore structure; however, CNTs within the pores naturally grow vertically because of the spatial confinement provided by the pore structure. Total synthesis time was adjusted between 2-20 minutes according to the desired length of the CNTs. After synthesis, the chamber was immediately evacuated to remove reactive species, and the sample was allowed to cool to room temperature before being removed from the chamber.

Processing of the SWCNTs within the anodized nanoporous structure continues with electrodepositing metallic nanorods from the conductive layer at the pore bottoms, up through the pores until contact with the base of the SWCNTs is achieved. Pd has been widely used for making ohmic contacts to SWCNTs, and as such was chosen as the material for electrodeposition, although other metals are also contemplated. During electrodeposition of Pd, the sample is immersed in a solution of 0.01 M $PdCh_2$ in 0.10 M HCl. Pd is deposited by applying a negative potential to the conductive underlayer of the anodized structure, using Pt gauze as a counter electrode. Deposition continues until Pd deposited reaches the base of the SWCNT.

Application of a thin gate dielectric (~1 nm) around the circumference of the SWCNTs proceeds by either atomic layer deposition (ALD) of a dielectric material or electrodeposition and oxidation of a suitable metal or atomic layer deposition (ALD) of a dielectric material. Materials contemplated for the dielectric material include $SiO_2$, $HfO_2$, and $Al_2O_3$. A gate contact is then deposited around the dielectric-encapsulated SWCNTs using either atomic layer deposition or electron beam evaporation of Pd or other acceptable contact metal. The gate contact coats the CNT structure and porous template and is electrically addressable at the top surface of the structure.

For mechanical strength and electrical isolation of the device channel, a relatively thick layer of $SiO_x$ or other electrically insulating material is deposited to fill the top pore diameter completely and electrically isolate the gate contact from the drain contact. The thickness of this layer depends on the pore diameter and SWCNT height. Excess isolation material will then be etched away from the top surface of the structure, leaving an exposed SWCNT tip and gate contact metal. A top drain and gate electrical contact will then be deposited by electron beam evaporation, completing the device. Patterning of devices and electrical contacts could be realized using conventional photolithographic means.

The completed device functions as a traditional field effect transistor. Electrical current flows from the bottom source electrode to the top drain electrode, with the current modulated by application of a gate voltage to the gate dielectric material. One or more SWCNTs may be present in each pore, with multiple SWCNTs allowing for higher current carrying capacity. Electrically connecting individual devices allow for digital logic, similar to conventional semiconductor technology.

A vertically oriented two-terminal resistor or diode may be realized from this structure as well. Following the process flow steps 1-4 for the FET device, a one terminal device is constructed using the SWCNT as the channel. For a second electrical contact, an atomic force microscope (AFM) tip may be used, or steps 7-8 in the FET process flow may be used to create a contact pad. Such a device could also serve as an electron emitter or vertical electrical interconnect in electrical devices.

Utilization of two or more catalyst layers within the structure could be used to grow SWCNTs from multiple (vertical) locations within the pores, creating junctions between SWCNTs allows for the creation of diodes. Top and bottom electrical contacts may be made by means illustrated in the process flow for the FET device.

More broadly, the multilayer catalytic structure described herein may be used to create nanostructures other than carbon nanotubes by selection of an appropriate catalyst. For example, nanowires synthesized using CVD (including Si[2], Ge[3], GaAs[4]) by the vapor-liquid-solid (VLS) mechanism may be synthesized by using Au as the catalyst layer and appropriate CVD synthesis conditions. The resulting nanowires may then be functionalized into devices in a manner similar to that described for CNT-based devices.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected

What is claimed:

1. A method comprising:
   providing a substrate;
   placing a first layer including a first material on the substrate
   stacking a layer of catalyst for synthesis of carbon nanostructures atop the first layer;
   stacking a second layer including said first material atop the layer of catalyst; and then
   creating a plurality of nanopores in the first layer, catalyst, and second layer;
   wherein each of the nanopores serially traverses the layer of catalyst and the second layer; and then
   synthesizing with the catalyst a carbon nanostructure in each of the nanopores.

2. The method of claim 1 wherein said first material includes aluminum.

3. The method of claim 2 wherein said creating a plurality of nanopores is by anodizing the aluminum.

4. The method of claim 1 wherein said synthesizing is by depositing carbon from a vapor phase.

5. The method of claim 4 wherein said synthesizing is in the presence of a plasma.

6. The method of claim 1 wherein said synthesizing is by chemical vapor deposition enhanced with plasma generated by microwave energy.

7. The method of claim 1 wherein the catalyst is in a substantially uniform layer.

8. The method of claim 7 wherein the catalyst is one of Fe, Co, Ni, and Pd.

9. The method of claim 1 wherein the substrate is electrically conductive.

10. The method of claim 9 wherein the substrate is Ti.

11. The method of claim 1 wherein the carbon nanostructure is a carbon nanotube having no more than two walls.

12. The method of claim 1 wherein the nanopores are oriented vertically.

13. The method of claim 1 wherein said creating a plurality of nanopores is after said placing a first layer, said stacking a catalyst, and said stacking a second layer;
wherein said creating serially transverses the first layer; and
wherein the carbon nanostructure grows from a position intermediate along the length of the corresponding nanopore.

14. The method of claim 1 which further comprises electrically biasing with a DC voltage the substrate relative to the walls of a chamber, wherein said synthesizing is in the chamber during said biasing.

15. The method of claim 1 wherein said stacking a catalyst is stacking a first layer of a catalytic material, and which further comprises stacking a second layer of a catalytic material atop the second layer, and said creating includes the second layer of catalytic material.

16. The method of claim 1 which further comprises embedding the catalyst into at least one of the first layer or the second layer prior to said synthesizing.

17. The method of claim 1 wherein each pore has an inner diameter, each nanostructure has an outer diameter, and the outer diameter is less than half of the inner diameter.

18. The method of claim 1 wherein each pore has a sidewall, the catalyst is embedded in the sidewall, and the carbon nanostructure grows from the embedded catalyst.

19. The method of claim 18 wherein each pore has a top and a bottom, and each carbon nanostructure grows from a location intermediate of the top and the bottom.

20. The method of claim 1 wherein said stacking a first layer is before said stacking a catalyst, and said stacking a catalyst is before said stacking a second layer.

21. A method comprising:
providing a substrate;
placing a first layer including a first material on the substrate
stacking a layer of catalyst for synthesis of carbon nanostructures atop the first layer;
stacking a second layer including said first material atop the layer of catalyst;
diffusing the layer of catalyst into at least one of the first layer or the second layer; wherein each of a plurality of nanopores serially traverses the layer of catalyst and the second layer, and
synthesizing with the catalyst a carbon nanostructure after said diffusing.

22. The method of claim 21 wherein said diffusing is by annealing the substrate, first layer, catalyst, and second layer.

23. The method of claim 22 wherein said annealing is at a temperature above about 400 degrees C.

24. The method of claim 21 which further comprises creating said plurality of nanopores in said first material before said synthesizing.

25. The method of claim 24 wherein said creating said plurality of nanopores is before said diffusing.

26. The method of claim 21 wherein said first material includes aluminum and which further comprises anodizing the aluminum to create said plurality of nanopores, wherein said synthesizing is in the nanopores.

27. The method of claim 26 wherein said diffusing is before said anodizing.

28. The method of claim 27 wherein said diffusing is by annealing.

29. The method of claim 21 which further comprises electrically biasing with a DC voltage the substrate relative to the walls of a chamber, wherein said synthesizing is in the chamber during said biasing.

30. The method of claim 21 wherein said stacking a catalyst is placing a first catalytic material, and which further comprises stacking a second catalytic material atop the second layer.

31. The method of claim 30 which further comprises diffusing the second catalytic material into the second layer including said material.

32. The method of claim 21 wherein each pore has an inner diameter, the nanostructures are carbon nanotubes having an outer diameter, and the outer diameter is less than half of the inner diameter.

33. The method of claim 21 wherein each pore has a top and a bottom, and each carbon nanostructure grows from a location intermediate of the top and the bottom.

34. The method of claim 21 wherein said stacking a first layer is before said stacking a catalyst, said stacking a catalyst is before said stacking a second layer, and the carbon nanostructures are single-walled carbon nanotubes.

35. The method of claim 21 wherein said synthesizing is by chemical vapor deposition enhanced with plasma.

36. The method of claim 21 wherein the substrate is electrically conductive.

37. The method of claim 21 wherein the substrate is Si.

38. A method comprising:
providing a substrate;
placing a first layer including a first material on the substrate;
stacking atop the first layer a catalyst for synthesis of carbon nanostructures;
stacking a second layer of said first material atop the catalyst;
creating a plurality of nanopores in the first layer, catalyst, and second layer;
placing the nanoporous substrate with the first material and the catalyst in a chamber having a second organic material in the vapor phase and a plasma;
electrically biasing the substrate relative to the walls of the chamber after said placing; and
synthesizing with the catalyst a carbon nanostructure in each of the nanopores during said biasing.

39. The method of claim 38 wherein during said synthesizing the biasing is electrically positive.

40. The method of claim 38 wherein during said synthesizing the biasing is electrically negative with a difference of more than 150 volts.

41. The method of claim 38 wherein said creating a plurality of nanopores is a plurality of vertical nanopores.

42. The method of claim 38 wherein said first material includes aluminum and said creating a plurality of nanopores is by anodizing.

\* \* \* \* \*